(12) United States Patent
Quix

(10) Patent No.: US 10,337,389 B2
(45) Date of Patent: Jul. 2, 2019

(54) CONTROL MEANS FOR CONTROLLING THE COOLANT FLOWS OF A SPLIT COOLING SYSTEM

(71) Applicant: Ford Global Technologies, LLC, Dearborn, MI (US)

(72) Inventor: Hans Guenter Quix, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 553 days.

(21) Appl. No.: 15/004,421

(22) Filed: Jan. 22, 2016

(65) Prior Publication Data

US 2016/0215680 A1 Jul. 28, 2016

(30) Foreign Application Priority Data

Jan. 26, 2015 (DE) .................. 10 2015 201 240
Jan. 26, 2015 (DE) .................. 10 2015 201 242
Jan. 26, 2015 (DE) .................. 10 2015 201 244

(51) Int. Cl.
*F01P 3/02* (2006.01)
*F16K 11/076* (2006.01)
*F16K 11/085* (2006.01)
*F01P 7/14* (2006.01)

(52) U.S. Cl.
CPC .............. *F01P 3/02* (2013.01); *F16K 11/076* (2013.01); *F16K 11/085* (2013.01); *F01P 2003/027* (2013.01); *F01P 2003/028* (2013.01); *F01P 2007/146* (2013.01); *F01P 2060/08* (2013.01)

(58) Field of Classification Search
CPC .... F01P 3/02; F01P 2060/08; F01P 2007/146; F01P 2003/027; F01P 2003/028; F16K 11/085; F16K 11/076
See application file for complete search history.

(56) References Cited

U.S. PATENT DOCUMENTS

| 4,423,705 A | 1/1984 | Morita et al. |
| 5,617,815 A * | 4/1997 | Spies ............ F16K 11/076 123/41.1 |
| 6,182,616 B1 * | 2/2001 | Itoh .................. F01M 5/002 123/41.1 |
| 9,243,545 B2 | 1/2016 | Quix |
| 2007/0252015 A1 | 11/2007 | Norris et al. |

(Continued)

FOREIGN PATENT DOCUMENTS

| CA | 2405444 A1 | 1/2003 |
| CN | 101949322 A | 1/2011 |
| CN | 102146835 A | 8/2011 |

(Continued)

OTHER PUBLICATIONS

State Intellectual Property Office of the People's Republic of China, Office Action and Search Report Issued in Application No. 201610052449.1, Feb. 2, 2019, 9 pages. (Submitted with Partial Translation).

*Primary Examiner* — Hung Q Nguyen
(74) *Attorney, Agent, or Firm* — Julia Voutyras; McCoy Russell LLP

(57) ABSTRACT

Methods and systems are provided for a split cooling system for an engine. In one example, a system may include a valve with a plurality of positions for diverting coolant or mixing coolant based on engine conditions.

20 Claims, 22 Drawing Sheets

(56) References Cited

U.S. PATENT DOCUMENTS

2011/0296834 A1    12/2011    Kuhlbach et al.

FOREIGN PATENT DOCUMENTS

| | | |
|---|---|---|
| CN | 102374076 A | 3/2012 |
| CN | 103184921 A | 7/2013 |
| CN | 203867685 U | 10/2014 |
| DE | 19809124 A1 | 9/1999 |
| DE | 10155386 A1 | 5/2003 |
| DE | 10323900 A1 | 1/2005 |
| DE | 102006055536 A1 | 6/2008 |
| DE | 102011081183 A1 | 2/2013 |
| DE | 102012200003 A1 | 7/2013 |
| DE | 102014200054 A1 | 7/2014 |
| DE | 102013213119 A1 | 1/2015 |
| DE | 102014200668 A1 | 7/2015 |
| EP | 2392794 A1 | 12/2011 |
| WO | 2005090841 A1 | 9/2005 |
| WO | 2008029058 A2 | 3/2008 |

\* cited by examiner

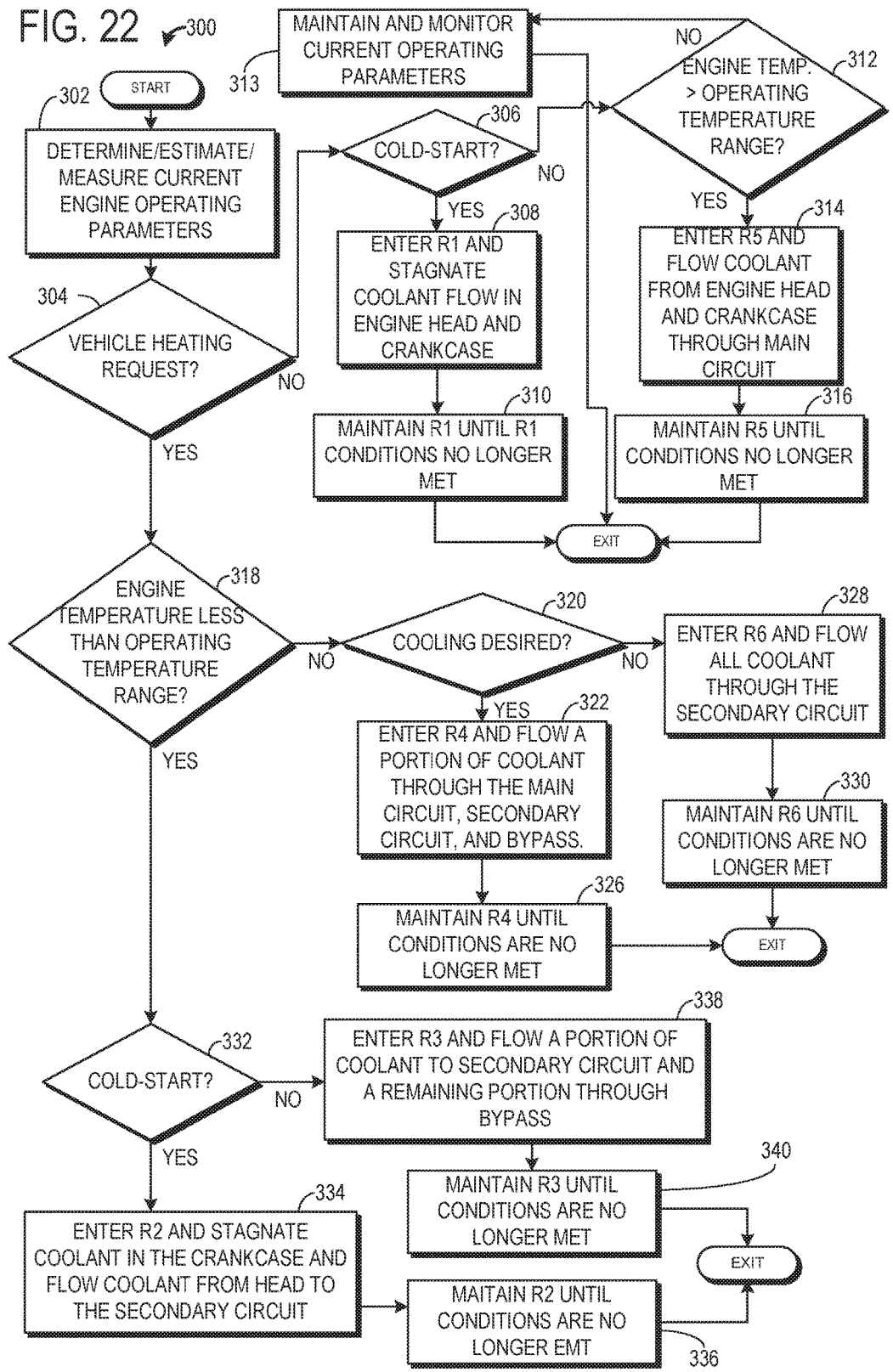

CONTROL MEANS FOR CONTROLLING THE COOLANT FLOWS OF A SPLIT COOLING SYSTEM

CROSS REFERENCE TO RELATED APPLICATIONS

The present application claims priority to German Patent Application No. 102015201244.1, filed Jan. 26, 2015, German Patent Application No. 102015201240.9, filed Jan. 26, 2015, and German Patent Application No. 102015201242.5, filed Jan. 26, 2015, the entire contents of each of which are hereby incorporated by reference for all purposes.

FIELD

The present disclosure description relates generally to a control means for controlling the coolant flows of a split cooling system of an internal combustion engine, in particular of a motor vehicle.

BACKGROUND/SUMMARY

Fuel efficiency decreases for vehicles undergoing an engine cold-start due to increased friction of movable parts, increased viscosity of engine oil, and an exhaust aftertreatment device not being lit-off. For the above-mentioned reasons, endeavors in the further development of internal combustion engines are focused on achieving quicker heating of the exhaust aftertreatment device. Furthermore, engines are operated within a certain temperature range and in order to operate with the range, a coolant system may be used. Air-cooled internal combustion engines for this purpose have areas comprising a usually fin-like external structure in order to deliver some of the operating heat to the surrounding air via the surface thus enlarged. By contrast, the coolant rinsing over the engine block and the cylinder head in the case of water-cooled internal combustion engines absorbs a large part of the waste heat produced. For this purpose, channels usually arranged in the housing wall of the internal combustion engine are provided and together with the coolant flowing therethrough form what is known as a coolant jacket.

In order to prevent an overheating of the coolant, this is then conveyed via a closed cooling circuit through a suitable cooler. Here, at least some of the heat absorbed by the coolant is delivered to the surrounding air via the cooler, which is usually formed as a gas-coolant heat exchanger.

Since the introduction of water cooling, it has been known to combine engine cooling systems of this type with a vehicle heating system. In this way, the heat from the coolant produced can also be used to heat the vehicle interior (e.g., passenger cabin) independently of external influences. A heat exchanger routinely formed as a gas-coolant heat exchanger may be integrated into the cooling circuit. The operation of the vehicle heating system ensures that air from outside or from the interior of the vehicle is sucked in and guided past the heat exchanger or therethrough. In doing so, the air absorbs some of the heat energy before it is conveyed into the interior of the vehicle.

Besides the resultant increased comfort, however, vehicle heating systems also perform other desired operations, such as defrosting windows. By way of example, low external temperatures cause steam in the interior to precipitate onto the windowpanes. As a result, these may then become misted or even iced, whereby the view is clouded or even completely prevented. The defrosting ability of the vehicle heating system may aid in decreasing the precipitate accumulated onto the windowpanes.

Various embodiments of engine cooling systems in combination with vehicle heating systems may already be known. These in part provide a flow-free strategy, which is also referred to as a "no-flow strategy". The circulation of the coolant through the coolant jacket of the internal combustion engine is interrupted, in particular during the cold-start phase to allow the engine to reach an optimal operating temperature more rapidly. However, strategies of this type are not always suitable for vehicle heating systems operated with coolant. For example, an operator of the vehicle may desire interior vehicle heating during a cold-start due to low ambient temperatures, which in turn initiates coolant to flow to the engine, thus disabling the no-flow strategy.

In order to be able to apply the no-flow strategy in conjunction with a vehicle heating system using coolant flow, split cooling systems have been established. These provide a separation of a cooling circuit, the coolant jacket of the internal combustion engine being divided into a part for the engine block and into a part for the cylinder head. It is possible in this way to apply flowing coolant to the coolant jacket of the cylinder head directly from the start-up of the internal combustion engine, whereas the coolant flow to the coolant jacket of the engine block is advantageously still blocked (no-flow strategy).

Since the cylinder head containing the outlets for the exhaust gas experiences the greatest heating, the part of the coolant heated via this cylinder head can be used for the vehicle heating system. By contrast, the blocked part of the coolant jacket contributes to the fact that the engine block can be heated more quickly, without losing the heat energy required for this purpose in parts to the otherwise flowing coolant.

In particular, previous split cooling systems provide a division of the coolant jacket provide the arrangement of a proportional valve in order to control the individual parts of the cooling circuit. Here, a mixing of the coolant is prevented in that the sub-circuits are structurally separate from one another. Consequently, only the sub-circuit acting on the cylinder head is available in order to supply the vehicle heating system as required. This sometimes may be insufficient in the event of a high heat request for the heating of the vehicle interior. At the same time, the cooling of the internal combustion engine via the cooler is limited to the sub-circuit acting on the engine block. This leads to a reduced cooling capability of the internal combustion engine, since the entire coolant flow guided through the engine is not conveyed to the cooler.

As a result, neither a maximum cooling of the internal combustion engine nor a maximum heating of the vehicle interior consequently may be achieved. A possible balancing of these shortcomings via more efficient and/or larger coolers or a growing size of the coolant pump makes such systems more costly and does not always lead to the desired success.

CA 2 405 444 A1 discloses another form of a split cooling system for an internal combustion engine equipped with a turbocharger. However, the internal combustion engine here has a single coolant jacket passing through both the engine block and the cylinder head jointly. In addition, a liquid-cooled oil cooler is additionally provided, which is fluidically connected to the coolant jacket and a cooler as well as a liquid-cooled intercooler for the turbocharger and a coolant pump via a cooling circuit. A control means in the form of a multiple-way valve is arranged within the cooling circuit and controls the passage of the coolant to the individual components. The control means has a housing with a rotary body arranged therein, the rotary body being rotatable about its longitudinal axis. Parts of the rotary body communicate with outlets arranged on the housing around the longitudinal axis, in such a way that these are at least partially closed or opened depending on the position of the rotary body. The coolant flow can thus be split as required between parts of the cooling circuit and the components arranged therein.

In one example, the issues described above may be addressed by a method for rotating a rotating body of a control means of a split cooling system to one of a plurality of rotation positions based conditions to direct coolant flow from an upper side of a cylinder head and from a crankcase to one or more of a main coolant circuit, a secondary coolant circuit, and an external bypass, and where coolant from the upper side mixes with coolant from the crankcase for some of the rotation positions. In this way, coolant may be directed to a plurality of passages via a single device As one example, the valve may be rotated to a position such that coolant from the upper side may mix with coolant from the crankcase to provide increased cooling of the engine. In another example, the valve may be rotated to a different position such that coolant from the upper side may mix with coolant from the crankcase to provide increased vehicle heating. By doing this, one valve may be used to adjust engine cooling, vehicle heating, and/or engine heating. The split cooling system may simultaneously heat the engine while providing vehicle heating for one position of the valve. This may decrease manufacturing costs of the split cooling system while also decreasing a size of the cooling system.

It should be noted that the features discussed individually in the following description can be combined with one another in any technically feasible manner and therefore present further embodiments of the present disclosure. The description characterizes and specifies the present disclosure additionally in particular in conjunction with the figures. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 22 shows a method for operating the control means.

DETAILED DESCRIPTION

Figure 1:
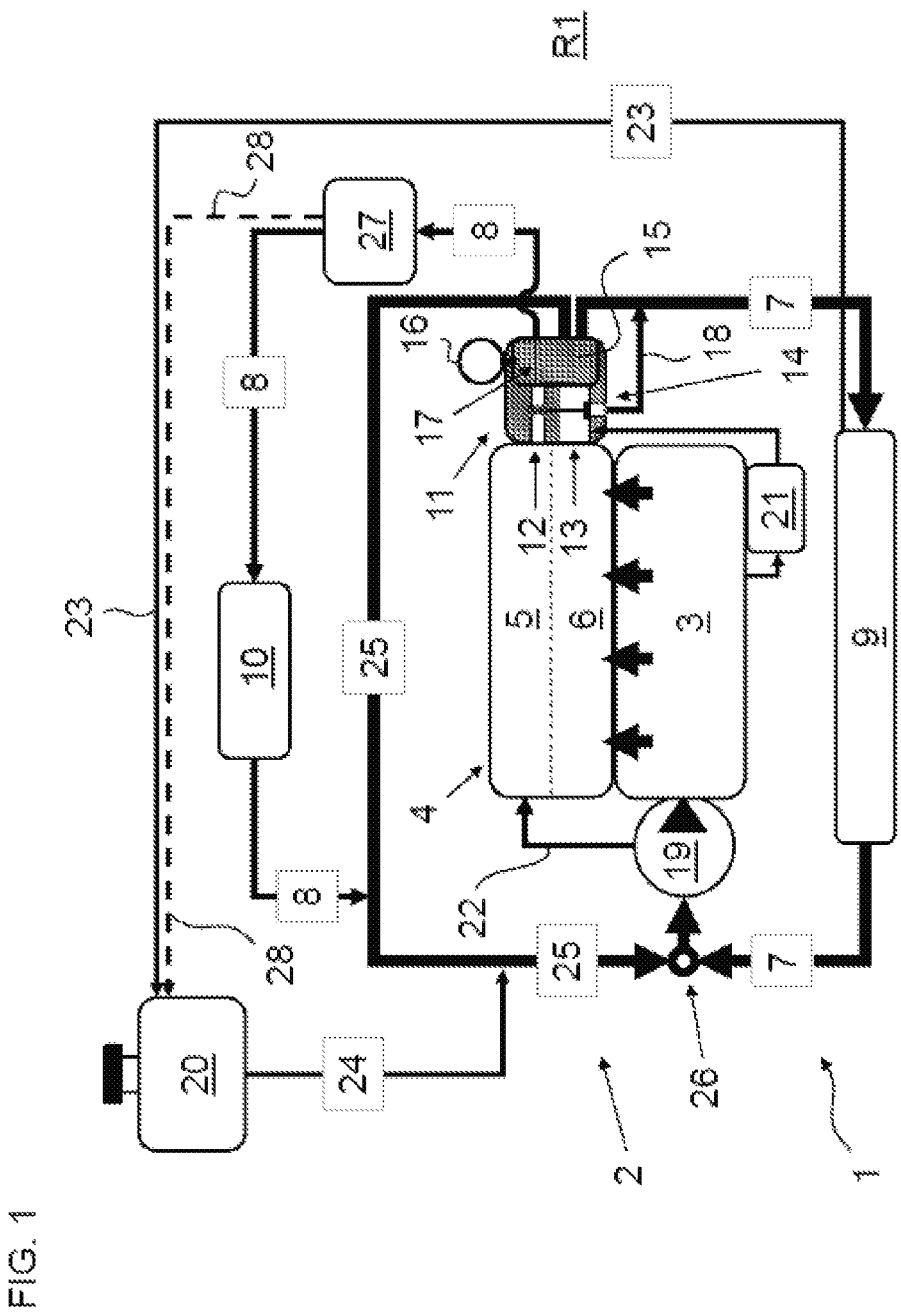
FIG. 1 shows a schematic illustration of a combustion engine according to the present disclosure having a split cooling system according to the present disclosure, in the phase thereof for warming up the combustion engine.
Figure 2:
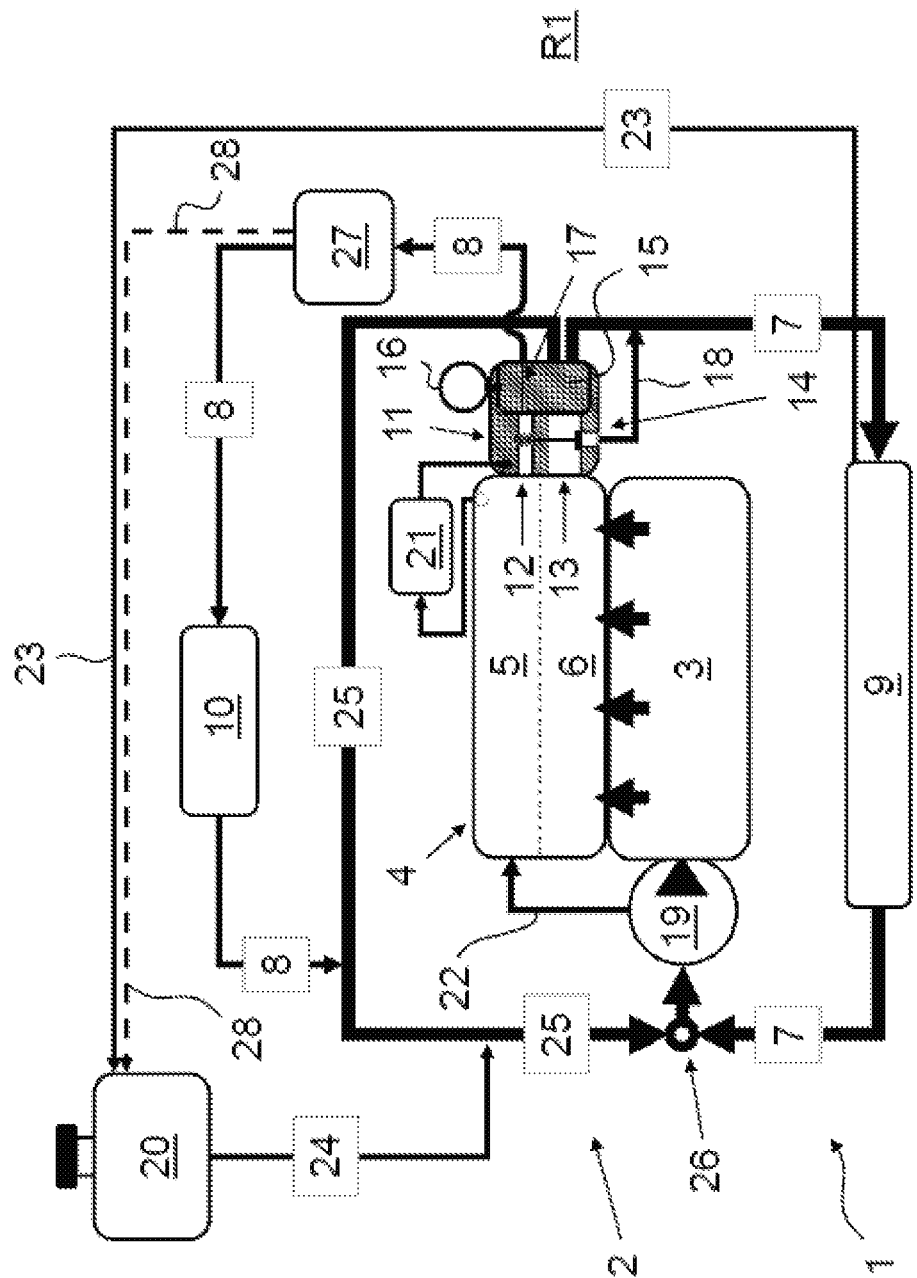
FIG. 2 shows the schematic illustration from FIG. 1 in an alternative arrangement of a component of the split cooling system according to the present disclosure.
Figure 3:
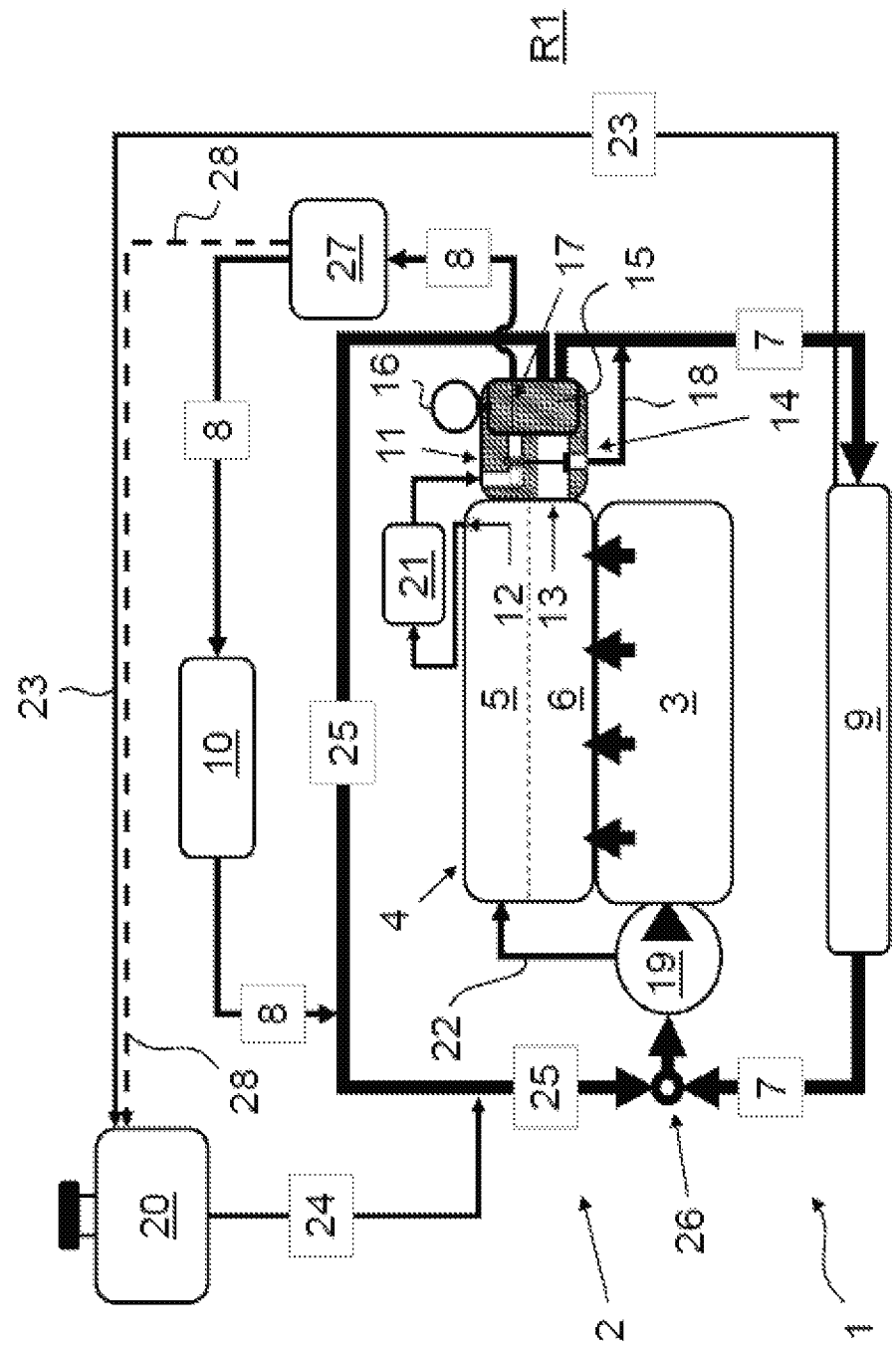
FIG. 3 shows the schematic illustration from FIG. 2 in an alternative embodiment as regards the connection of the components of the split cooling system according to the present disclosure.
Figure 9:
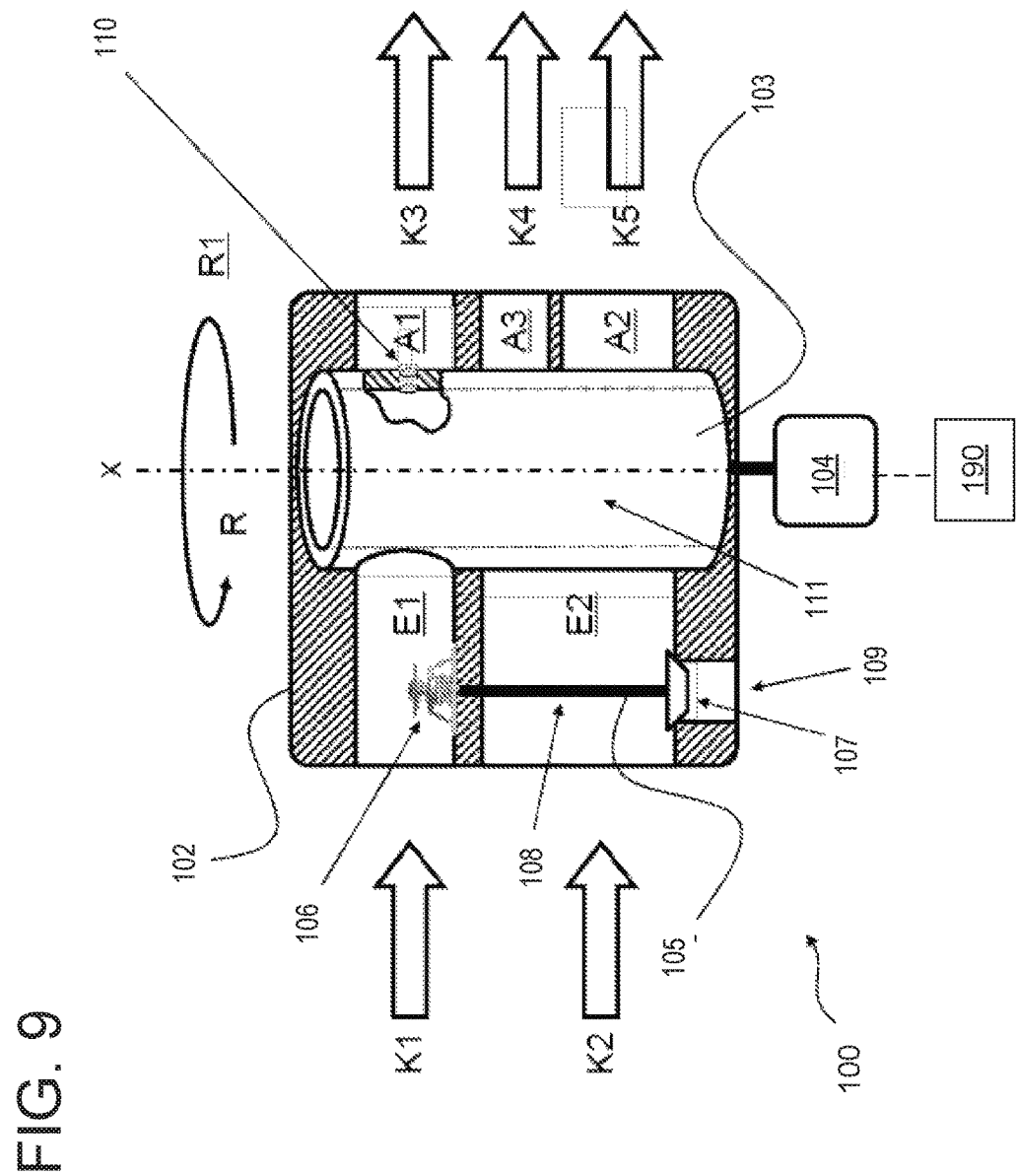
FIG. 9 shows a schematic illustration of a control means according to the present disclosure for a split cooling system in at least partially sectioned view.
Figure 10:
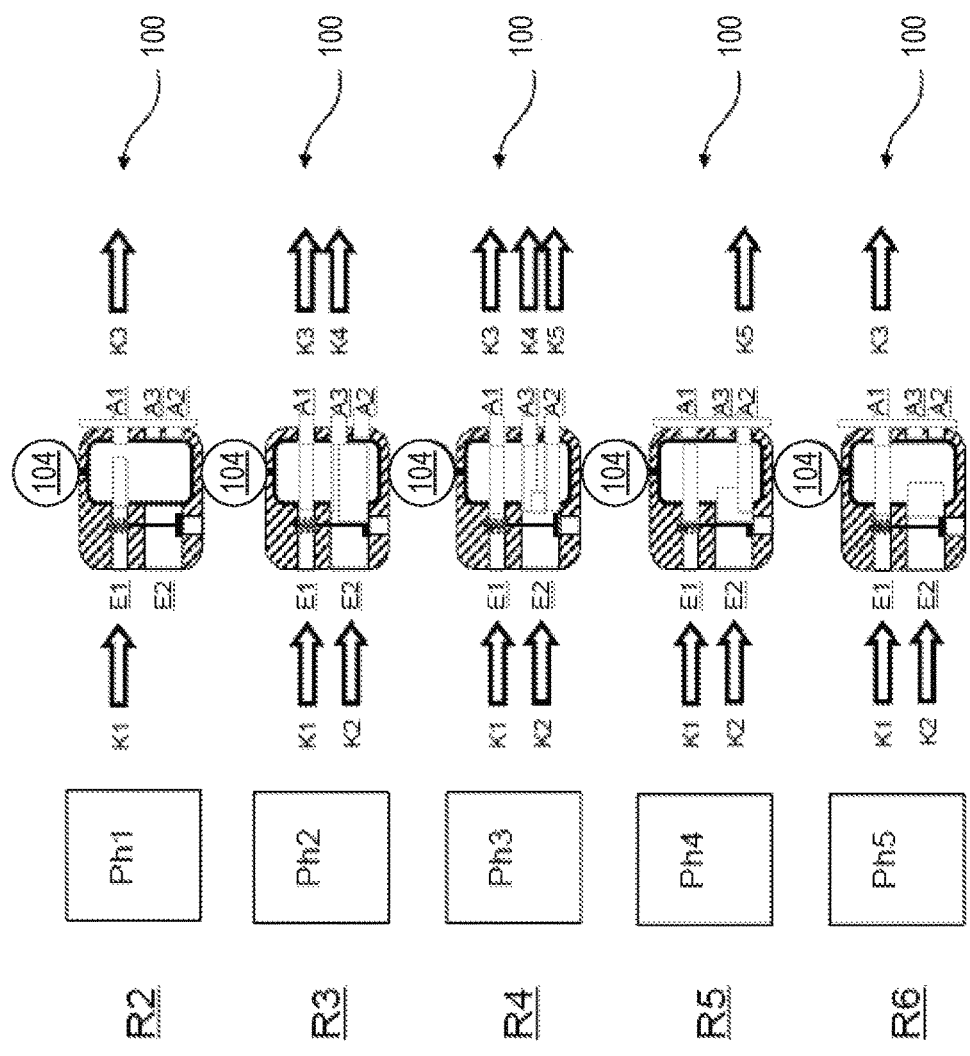
FIG. 10 shows the control means according to the present disclosure from FIG. 1 in changed control positions of one of its components.
Figure 11:
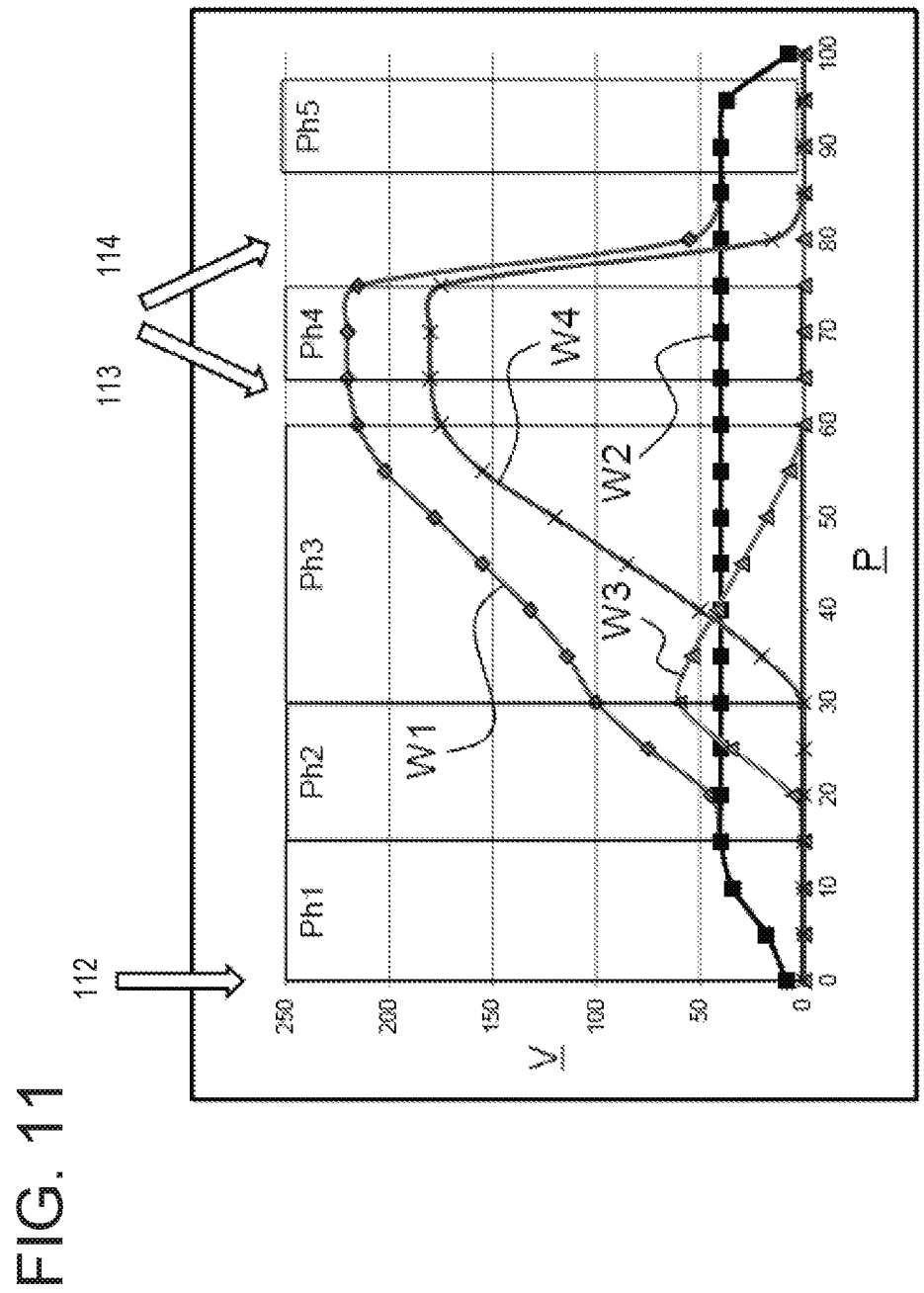
FIG. 11 shows a diagram as an overview of individual phases of a combustion engine and the states prevailing within a split heating system during said phases.
Figure 12:
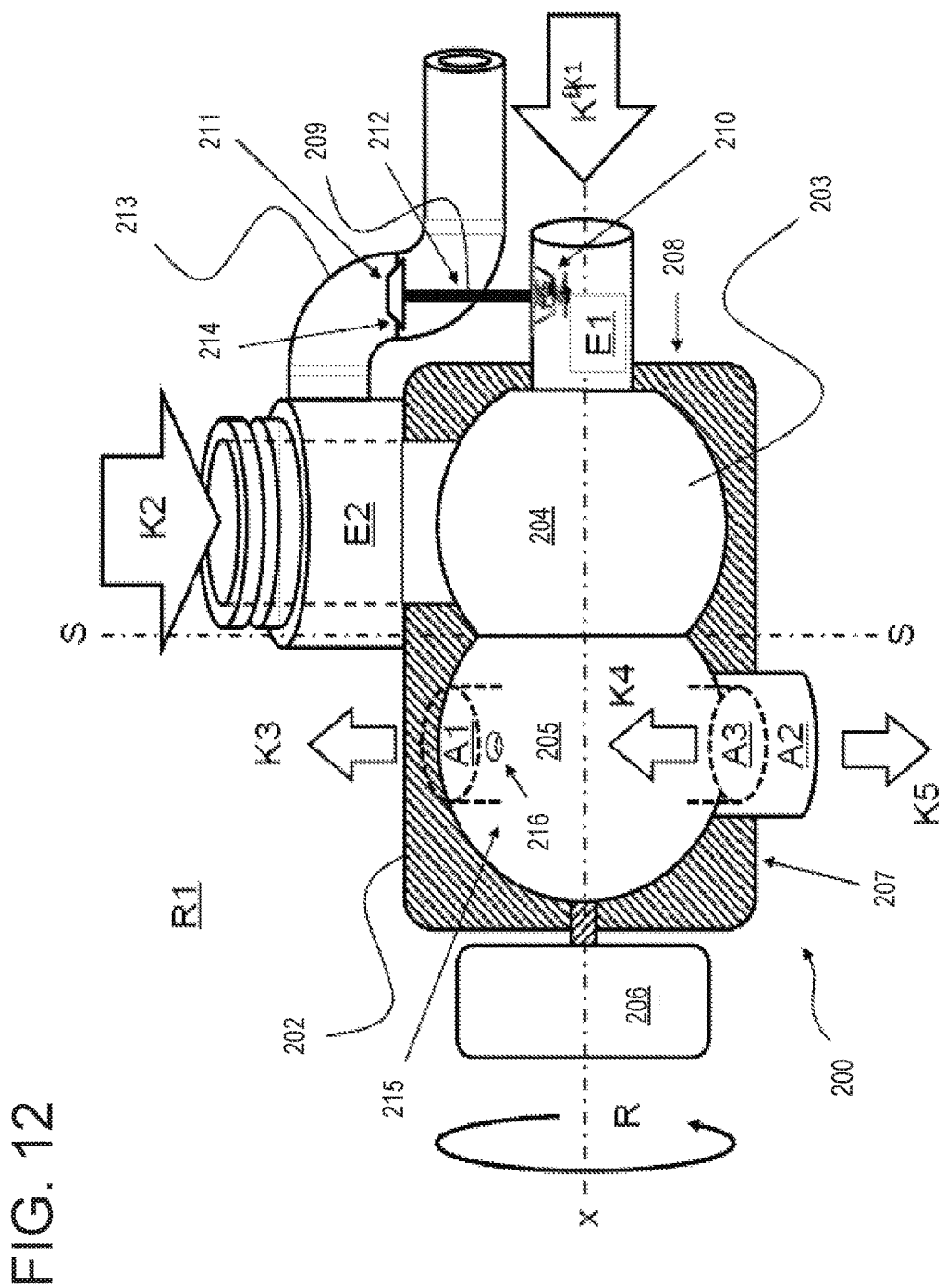
FIG. 12 shows a schematic illustration of a control means according to the present disclosure for a split cooling system in an least partially sectional illustration.
Figure 13:
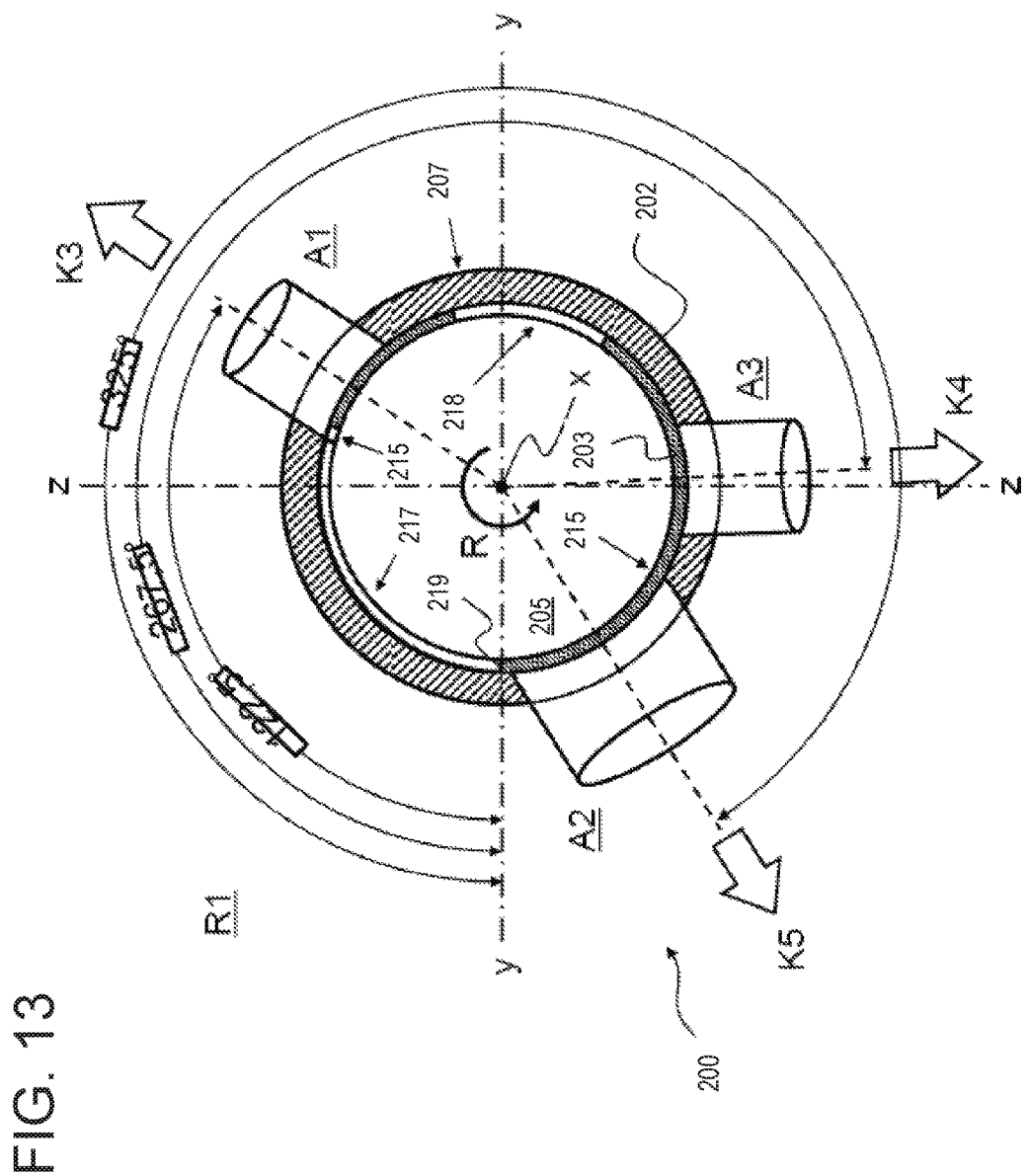
FIG. 13 shows the control means according to the present disclosure present disclosure from FIG. 13 in a section transversely to the longitudinal direction thereof.

The following description relates to systems and methods for a split cooling system. FIGS. 1, 2, and 3 depict various embodiments of a control means of the split cooling system. FIGS. 4, 5, 6, 7, and 8 illustrate different position of the control means altering a direction of coolant flow. FIG. 9 shows corresponding coolant flows based on inlets and outlets of the control means. FIG. 10 shows coolant flows based on a position of the control means. FIG. 11 shows a diagram depicting coolant flow in different phases of the control means. FIG. 12 shows an at least partially sectional illustration of the control means in the split cooling system. FIG. 13 shows a rotational relationship between the outlets of the control means. FIGS. 14, 15, 16, 17, 18, 19, 20, and 21 show schematic illustrations of the different positions of the control means. FIG. 22 shows a method for rotating the control means based on different engine and/or vehicle conditions.

The object of the present disclosure is to further develop a control means for controlling the coolant flows of a split cooling system of an internal combustion engine, in particular of a motor vehicle, to such an extent that, in spite of a compact structure and in addition to an improved heating of the internal combustion engine, a maximized capability in respect of the cooling of the internal combustion engine and the heating of the vehicle interior is also enabled as necessary.

A control means according to the present disclosure for controlling the coolant flows of a split cooling system of an internal combustion engine will be presented hereinafter, which control means is advantageously suitable for use in a split cooling system of an internal combustion engine of a motor vehicle.

The control means according to the present disclosure firstly comprises a housing, which has at least two inlets and at least two outlets. The housing may advantageously be a closed hollow body, through which coolant can flow through the inlets and outlets of said housing. The housing may be constructed in a fluid-tight manner, such that the coolant can enter the housing only via at least one of the inlets and can exit from the housing again only via at least one of the outlets, where there are no other inlets or outlets other than those described herein.

Furthermore, a rotary body is provided, which is arranged rotatably within a chamber of the housing. A rotatable mounting is understood to mean a mounting that enables a rotation of the rotary body about its longitudinal axis. Here, it should be noted that the outer surface of the rotary body and the inner side of the housing communicate with one another at least in regions in such a way that a fluid-tight unit is produced. In other words the rotary body and housing are matched to one another such that the rotary body initially prevents a possible flow of coolant out from the housing. Here, by way of example, a metallically sealing embodiment or the use of one or more sealing means may be provided.

In order to then enable the desired regulation for a possible flow of coolant through the control means, the rotary body has at least one opening arranged on the periphery. For this purpose, the rotary body may preferably be a hollow body. Said opening may then be arranged advantageously through a wall of the rotary body extending around the longitudinal axis. Alternatively or additionally, an at least partially solid embodiment of the rotary body is also conceivable, the opening then extending through part of the rotary body.

The term 'opening' is to be understood here both per se and in combination with the housing. The opening per may thus be referred to as a through-bore, for example. This may extend typically from one region of the lateral surface to another region of the lateral surface of the rotary body, through said rotary body. In combination with the housing, the opening may be understood for example as a peripheral tapering and/or recess of the rotary body. Here, the opening is provided in combination as it were with said tapering and/or recess and an associated region of the inner side of the housing.

In its arrangement within the chamber of the housing the rotary body is rotatable between a plurality of control positions. Depending on the respective control position of the rotary body, the possible flow of coolant through the control means may now be controlled. A coolant flow entering the housing may thus be controlled within the control means, such that this coolant flow can exit at least in part through one of the outlets. For this purpose, the outlets are arranged in or on the housing around the longitudinal axis of the rotary body and have different orientations. Here, at least one of the possible control positions of the rotary body is intended to allow a coolant flow entering the housing through at least one of the inlets to exit at least in part from at least one of the outlets via the opening in the rotary body or, by contrast, to block the exit of said coolant flow from at least one of the outlets of the housing.

In accordance with the present disclosure the inlets of the control means are divided as described below.

A first of the inlets of the housing is intended to be fluidically connected to the coolant jacket of a cylinder head of the internal combustion engine. In other words, when the control means is installed in the split cooling system, a coolant flow leaving the coolant jacket of the cylinder head may enter the housing via the first inlet.

A coolant jacket of the cylinder head may be understood to mean both a coolant jacket acting on the entire cylinder head with coolant or, alternatively, a coolant jacket acting only on a region of the cylinder head with coolant. In accordance with a preferred alternative embodiment of the present disclosure, the coolant jacket discussed here may be limited only to an outlet-side or upper portion of the cylinder head. Since this outlet-side or upper portion already constitutes one of the hottest regions of the cylinder head on account of the arrangement of outlets for exhaust gas, it is possible in accordance with the preferred embodiment for only the coolant acting on this region to also be able to flow into the housing via the first inlet.

By contrast, a second of the inlets of the housing may be fluidically connected to the coolant jacket of an engine block of the internal combustion engine, i.e. to the coolant jacket of the engine block. In particular under consideration of the previously discussed alternative embodiment, in respect of the coolant flowing in via the first inlet the coolant jacket discussed here may be associated either exclusively with the engine block or at least in part also with a lower or inlet-side portion of the cylinder head. In this way, coolant acting on the engine block flows into the housing via the second inlet either alone or together with coolant acting on the inlet-side or lower portion of the cylinder head.

In respect of the arrangement of the outlets, it should be emphasized that these are all arranged in or on the housing in a common plane about the longitudinal axis of the rotary body.

In the sense of the present disclosure a common plane is also understood to mean a region between two planes running parallel to one another, within which the outlets are arranged in a star shape as it were on a side face of the housing extending around the longitudinal axis of the rotary body. Said region, however, is to be clearly differentiated in terms of its size from an arrangement of the outlets, in such a way that for example one of the outlets is arranged at one end of the chamber considered in the longitudinal direction of the rotary body, whereas another outlet is placed at an end of the chamber opposite the first-mentioned end.

The arrangement of an internal connection, which is formed through or on and/or in the rotary body, is described in further detail below. The internal connection, which can be selected in at least one of the control positions of the rotary body, is designed to bundle any cooling flows within the control means and to discharge these jointly via one of the outlets. In this way, coolant flows entering the housing through the inlets can be combined by the internal connection in such a way that they are then conveyed jointly to just one of the outlets.

The control positions of the rotary body to be occupied for this purpose will be discussed in greater detail further below, more specifically as the third and seventh control positions.

The advantages resulting in particular from the internal connection are basically substantiated in the fact that the proportions of coolant of the coolant jacket of the internal combustion engine occasionally circulating separately can now be combined with one another. In this way, use can be made, for example jointly, of the coolant from the coolant jacket of the cylinder head and additionally of the heat absorbed via the coolant jacket of the engine block. Thanks to the arrangement of the control means according to the present disclosure, the no-flow strategy can also be maintained for example for the coolant jacket of the engine block in order to achieve a quick heating of the internal combustion engine. In addition, it is now possible to jointly utilize the waste heat from the engine block and inlet-side cylinder head via the coolant and for example to provide cooling jointly where necessary.

In particular, the star-shaped arrangement as it were according to the present disclosure of all outlets arranged on the housing enables an extremely compact structure of the control means. This arrangement enables an advantageous distribution of said outlets around the housing within an individual plane.

Furthermore, the chamber of the housing accommodating the rotary body is divided within itself. In other words the chamber is divided into a front chamber and into a rear chamber. In the sense of the present disclosure the front chamber is understood to mean the part of the chamber in which the coolant can enter the housing of the control means via at least one of the inlets. By contrast, the rear chamber is understood to mean the part of the chamber via which the coolant that has entered the housing can be conveyed out again via at least one of the outlets. Here, the rear and front chambers do not form regions of the actual chamber separated from one another, but rather fluidically interconnected. Furthermore, the rotary body may be adapted here to the division of the chamber into a rear and a front chamber, in such a way that it is adapted at least in terms of its outer form to the inner form of the chamber thus divided. In any case the rotary body extends over both parts of the chamber; more specifically from the front chamber to the rear chamber and vice versa.

In this embodiment the outlets are only arranged around the rear chamber. All outlets are thus directly fluidically connected to the rear chamber. Accordingly, it is clear that in such an embodiment coolant that has flowed into the housing can leave this housing again only via the rear chamber by being conveyed through at least one of the outlets.

Here, at least the rear chamber is at least partly spherical. In this context it is envisaged that the portion of the rotary body disposed in the region of the rear chamber may also be spherical accordingly.

Both chambers may preferably also be at least partly spherical. Alternatively or additionally, an at least partial cylindrical embodiment is also considered to be advantageous.

With regard to the advantages resulting from a spherical embodiment, mention should be made of those that result from an improved possibility to seal the rotary body with respect to the housing and/or from smaller external dimensions with respect to the available installation space.

With respect to the inlets of the housing, these are arranged in the region of the front chamber. The outlets are therefore all arranged in the region of the rear chamber, whereas the inlets are all arranged in the region of the front chamber. This results in an optimal distribution of the inlets and/or outlets on the housing, the coolant flows being controllable in a simple manner by rotation of the rotary body between its different control positions. The reason for this may be to allow cooperation between a plurality of openings in the rotary body and the inlets and also outlets in the individual control positions.

Here, a first inlet is arranged on a head side of the housing. Head sides are interpreted as those regions of the housing between which the rotary body extends in the direction of its longitudinal axis. It should be reminded at this juncture that said first inlet is intended for fluidic connection to the coolant jacket of a cylinder head of the internal combustion engine. By contrast, with respect to the second inlet, this is arranged on a side face of the housing extending around the longitudinal axis of the rotary body. It should also be reminded at this juncture that this second inlet is intended for a fluidic connection to the coolant jacket of an engine block of the internal combustion engine.

Due to this embodiment it is possible that coolant flowing in from the coolant jacket of the cylinder head of the internal combustion engine may flow into the front chamber at the head side of the housing via the first inlet. From here, the coolant may then flow further into the second chamber, which it can leave again in the corresponding control position or positions via at least one outlet disposed on the side face in the region of the rear chamber. Here, the rotary body may be designed particularly preferably in such a way that it has an opening oriented toward said head side of the housing.

In this way, the coolant coming from the coolant jacket of the cylinder head can flow permanently into the housing, any forwarding of said coolant via the outlets being dependent on the respective control position of the rotary body. A no-flow strategy can thus be established for the coolant jacket of the engine block of the internal combustion engine, whereas coolant flows through the coolant jacket associated with the cylinder head.

The split cooling system to be utilized advantageously for the integration of the control means according to the present disclosure should have a cooling circuit having at least one primary circuit and a secondary circuit. Within the primary circuit, a cooler arrangement should be integrated, through which coolant located within the cooling circuit can then pass. Said cooler arrangement is then designed to transmit heat from the coolant to another medium. By way of example, the cooler arrangement may be an air-coolant heat exchanger. In this way, the heat from the coolant can be delivered at least in part to the surrounding air, for example. A liquid-liquid heat exchanger is of course also possible.

A heating arrangement, through which the coolant located within the cooling circuit may likewise pass, could be integrated within the secondary circuit. The heating arrangement is then designed to transmit the heat energy contained in the coolant to another medium. The heating arrangement advantageously may likewise be an air-coolant heat exchanger, such that the heat can be transmitted to air flowing past said heat exchanger or through the heating arrangement. Said flow of air may then be used to control the temperature of the vehicle interior. A liquid-liquid heat exchanger is of course also possible.

The aforementioned sub-circuits should be connected to a coolant jacket associated with the internal combustion engine. Here, said coolant jacket is advantageously composed of the separate coolant jackets. As already mentioned previously, one of these two coolant jackets may be arranged on or around the cylinder head, in particular around an upper, i.e. outlet-side portion of the cylinder head of the internal combustion engine, whereas the other coolant jacket may be arranged on or around the engine block, in particular the engine block and a lower, i.e. inlet-side portion of the cylinder head of the internal combustion engine. Here, the primary circuit is intended to be fluidically connected at least to the coolant jacket of the engine block. In this way, the coolant jacket of the engine block is located together with the cooler arrangement within the primary circuit. Accordingly, the secondary circuit is intended to be fluidically connected to the coolant jacket of the cylinder head or an upper, i.e. outlet-side portion of the cylinder head. Consequently, said coolant jacket and the heating arrangement are located jointly within the secondary circuit.

The rotary body may be interpreted in principle as a sort of curved perforated sheet, of which the openings communicate with the inlets and outlets of the housing. Depending on the control positions, either all inlets and/or outlets may thus be closed or opened at least in part as a result of the fact that at least one of the openings in the rotary body is aligned at least partially with an outlet or inlet by rotation of said rotary body. A fluidic connection is thus created between at least one inlet and at least one outlet via the inner connection formed here by the rotary body.

In accordance with the present disclosure a first of the outlets of the housing of the control means can be used in order to produce a fluidic connection to the secondary circuit of the split cooling system, which contains the heating arrangement. Furthermore, a second outlet of the housing of the control means may be used in order to produce a fluidic connection to the primary circuit of the split cooling system, which then contains the cooler arrangement.

In accordance with the present disclosure a further, third outlet may be arranged on the housing of the control means. This third outlet is then advantageously designed to be fluidically connected to an external bypass of the split cooling system. The external bypass discussed here is routinely used to introduce coolant flowing out from the internal combustion engine back into the internal combustion engine or into the corresponding coolant jacket or jackets through this external bypass. An external bypass of this type is used in conventional heating systems in particular in the warm-up phase of the internal combustion engine to circulate the coolant through the coolant jacket or jackets of the internal combustion engine without losses at the heating or cooler arrangement.

In this context, the present disclosure provides a control position of the rotary body in the form of what is known as a fifth control position, in which, of the outlets of the housing, the aforementioned third outlet and the second outlet can be fluidically connected jointly to the coolant jacket of the engine block and of the cylinder head of the internal combustion engine. In other words the second and third outlet can be connected to the two inlets. This control position is used for temperature control in the internal combustion engine. This is achieved by an appropriate control of the volume flows of the third and second outlet.

In the fourth control position it is possible with the control means arranged in the split cooling system for coolant flowing out from the housing to then be introduced in identical or different proportions into the external bypass (third outlet) and the secondary circuit (first outlet).

A circulation of the coolant within the entire internal combustion engine would be achievable accordingly.

With respect to the possible control positions of the rotary body, the possibility of a further, third control position is provided. This is characterized in that, in this third control position, the first inlet and the second inlet are fluidically connected to the first outlet. In the installed state of the control means according to the present disclosure in the split heating system, it is thus possible for coolant flowing into the housing from the cylinder head and from the engine block to be forwarded directly into the secondary circuit to the heating arrangement. In this way, all of the heat generated by the engine is provided to the heating arrangement.

The present disclosure also provides the possibility to arrange a thermostat arrangement. The thermostat arrangement may be disposed outside the housing of the control means. A simple design of the housing is thus possible, since this does not have to be designed in order to completely or at least partially accommodate the thermostat arrangement.

Furthermore, a diversion likewise disposed outside the housing may be provided. In the context of the present disclosure a diversion is understood to mean a sort of channel for the coolant, which preferably may be arranged in the region of the second inlet arranged laterally on the housing and is then fluidically connected thereto. Here, the diversion may have at least in part a cast part and/or a flexible part for example, such as tube. The diversion may be divided into a fixed and a flexible portion. The diversion advantageously may have a valve opening arranged for example in the fixed part of the diversion.

Said valve opening may then preferably communicate with a closure means of the thermostat arrangement in such a way that the valve opening can be both closed and opened by the closure means. Here, the opening and closing is to be interpreted in the sense of enabling or interrupting a fluid flow through the valve opening into the diversion. The diversion is intended to be fluidically connected to the primary circuit of the split cooling system.

The thermostat arrangement is designed, with at least partially closed outlets of the housing and overshoot of a maximum temperature for the coolant, to allow said coolant to flow into the primary circuit via the diversion by opening the valve opening. The diversion is envisaged in this respect as a sort of bypass, via which coolant waiting at the control means can be delivered to the primary circuit independently of the respective control position. For this purpose, the valve opening and therefore also the diversion can be closed via the thermostat arrangement, such that no coolant flows through the diversion during regular operation of the split cooling system.

With respect to the installed state of the control means in a split cooling system, the thermostat arrangement of said control means is consequently designed to divert the coolant at least in part into the primary circuit in spite of the primary circuit and/or secondary circuit being closed at least in part by the control means. The opening of the diversion necessary for this is then advantageously performed when an overshoot of a maximum temperature for the coolant is detected. The thermostat arrangement may identify said overshoot of a previously defined maximum temperature and to then open the valve opening and therefore the diversion.

Besides any electronic variations, the thermostat arrangement may be designed for example purely mechanically for this purpose, for example with use of a bi-metal.

In this way the thermostat arrangement may take on a failure function for the case in which the control means does not function as intended. Such a failure function is also known as a "fail-proof function", which is generally used to avert or at least reduce damage in the event of malfunctions of systems. The thermostat arrangement may therefore also be referred to as a "fail-proof thermostat arrangement". The fail-proof function implemented via the thermostat arrangement may be used to prevent any overheating of the internal combustion engine, provided the control means where required is not opened as necessary and can ensure other a sufficient coolant flow, in particular toward the cooler arrangement.

When a previously defined maximum temperature for the coolant is overshot, said coolant can be conveyed via the primary circuit to the cooler arrangement independently of the control position of the control means due to the thermostat arrangement.

With reference again to the possible control positions of the rotary body, the possibility of a second control position is provided. This is characterized in that merely the first inlet of the housing is fluidically connected to the first outlet. The coolant from the coolant jacket of the cylinder head or upper, i.e. outlet-side portion thereof can thus flow directly into the secondary circuit, which contains the heating arrangement. The second control position is therefore in particular advantageous in phases in which the internal combustion engine is still warming up and at the same time a heating request from the heating arrangement is met. Due to the blocking of the second inlet, the coolant of the engine block for example remains in its coolant jacket, without the internal combustion engine drawing further heat. A rapid heating of the internal combustion engine in spite of a heating request is thus still ensured.

In this context it is considered to be advantageous when the control means is able to form a leak channel. In the sense of the present disclosure a leak channel is considered to be an opening through which the coolant can pass. As can be inferred from the term "leak", this leak channel is small in size, such that only a small flow of the coolant through the leak channel is possible. In other words, the flow of the coolant enabled through the leak channel may also be referred to as a trickle flow.

In order to form the leak channel, this can be formed in accordance with the present disclosure particularly preferably in the rotary body. For this purpose, the wall of the rotary body may have a corresponding through-opening by way of example. Here, the leak channel is configured to still allow a coolant trickle flow out from the first outlet with otherwise blocked-off outlets.

The leak channel when the control means is blocked may be used in particular to continuously feed the actual temperature of the coolant in the internal combustion engine to the thermostat arrangement. In other words, when the control valve is blocked, it is thus possible for the thermostat arrangement not to be acted on by the coolant temperature currently actually present in the coolant jacket of the internal combustion engine. Consequently, it may be during this flow-free state of the coolant that the internal combustion engine overheats and the thermostat arrangement cannot intervene.

With the aid of the leak channel it is now possible for the thermostat arrangement to be subjected continuously to a flow of an at least small quantity of coolant in spite of the blocked control means. This small quantity is sufficient to bring the actually currently present temperature of the coolant in the internal combustion engine to the thermostat arrangement. In this way, any overheating or threat of overheating can be identified, in spite of the blocked control means, and can be averted for example by opening the diversion. As already explained previously, an opening of the diversion forwards coolant into the primary circuit and thus toward the cooler arrangement in order to be cooled accordingly.

In accordance with the envisaged position of the leak channel in the first control position, which then extends as it were between the internal connection and the first outlet of the housing, the control means is fluidically connected in the otherwise blocked state to the secondary circuit. The trickle flow thus takes place toward the heating arrangement, with no drainage via the primary circuit in the direction of the cooler arrangement. The resultant advantage lies in the quicker heating of the internal combustion engine in the blocked state of the control means in spite of the trickle flow through the leak channel, there being no flow of the coolant with corresponding cooling in the direction of the cooler arrangement.

The thermostat arrangement may particularly preferably have a spring element. Said spring element is advantageously temperature-sensitive. This spring element may be produced for example by the use of bi-metal. Such embodiments are characterized for example by a change in length, which is produced depending on the temperature surrounding the temperature-sensitive element. Said spring element may preferably be coupled in a force-transmitting manner to the closure means via a coupling rod. In this way, a temperature-dependent change in length of the spring element is transmitted to the closure means via the coupling rod, such that the valve opening can be opened or closed accordingly.

In a particularly preferred manner the temperature-sensitive spring element may be arranged at least partially within the first inlet. The coupling rod may be arranged outside the housing in order to connect the spring element to the closure means in a force-transmitting manner. This may enable a compact structure of the control means according to the present disclosure.

With respect to further preferred embodiments of the control means according to the present disclosure, the housing thereof by way of example may have a design that enables a direct arrangement of the control means in the region of the cylinder head of an internal combustion engine. Here, the first inlet of the housing may be directly fluidically connected to the coolant jacket of the cylinder head. At the same time, the second inlet of the housing may be directly fluidically connected to the coolant jacket of the engine block. Thanks to this embodiment, a structure that is compact on the whole can be produced, which additionally enables simple sealing. The necessary seal between internal combustion engine and control means can thus be provided via sealing means, for example via correspondingly heat-resistant flat seals and/or O-rings.

The present disclosure presents an advantageously developed control means for a split cooling system in the sense of an engine cooling system, which in spite of simple structure and in addition to an improved heating of the internal combustion engine also offers a maximum capability where necessary in respect of the cooling of the internal combustion engine and the heating of the vehicle interior. This is made possible by the arrangement according to the present disclosure of the control means, as a result of which the previously separated coolant flows through the internal combustion engine can now be bundled and thus forwarded together to the cooler arrangement (maximum cooling capability) or to the heating arrangement (maximum heating capability).

Here, the control means, contrary to the solutions previously presented, is embodied in such a way that in the installed state thereof the primary circuit and the secondary circuit of the split cooling systems can be connected to one another at least in part. The control means is able to fluidically interconnect the primary circuit and the secondary circuit as necessary accordingly. As a result, the otherwise strict separation of primary circuit and secondary circuit can consequently be bypassed as it were by the arrangement of the control means.

Further advantageous details and effects of the present disclosure are explained in greater detail hereinafter on the basis of different exemplary embodiments illustrated schematically in the figures, in which:

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

FIGS. 12-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

It should be noted that similar parts shown in the various figures may be provided with the same reference signs, and therefore these are generally also described only once. The terms "upper" and "lower" refer in each case to the plane of the drawing.

FIG. 1 shows a combustion engine 1 having a split cooling system 2 according to the present disclosure. The combustion engine 1 is suitable for installation in or on a motor vehicle (not shown specifically). Here, the split cooling system 2 may be used to cool the combustion engine 1 and to heat the interior of the motor vehicle.

In the present case, the combustion engine 1 is divided into a crankcase 3 and a cylinder head 4, wherein the cylinder head 4 has an upper side, i.e. outlet-side, cylinder head region 5 and a lower side, i.e. inlet-side, cylinder head region 6. The cylinder head 4 is connected to the crankcase 3 by means of its lower, i.e. inlet-side, cylinder head region 6. Both the crankcase 3 and the cylinder head 4 are surrounded at least partially (in a manner not shown specifically) by a coolant jacket, through which a coolant (not visible specifically) that can be circulated within the split cooling system 2 can be passed. Coolant in the coolant jacket adjacent to the crankcase 3 and/or the lower side 6 do not mix with coolant in the coolant jacket adjacent the upper side 5 in the combustion engine 1. The coolants may mix in a coolant circuit outside of the engine 1 and flow back to the engine where coolant flow is separated to either the upper side 5 or the crankcase 3. In this way, coolant in the upper side 5 is fluidly separated from coolant in the lower side 6 and the crankcase 3 while flowing in the coolant jacket.

For this purpose, the split cooling system 2 according to the present disclosure comprises a main cooling circuit 7 and a secondary cooling circuit 8, indicated by thick and thin black lines respectively. A thick black line has a greater thickness than a thin black line. As shown here, the two circuits 7, 8 can be lines, ducts, pipes, and/or hoses. As shown, a cooler arrangement 9 is integrated into the main circuit 7 and is connected fluidically in an appropriate manner to the main circuit 7. The cooler arrangement 9 can be an air/coolant heat exchanger of the type used to cool liquid-cooled combustion engines 1. In contrast, the secondary circuit 8 has a heating arrangement 10, which is integrated into said secondary circuit and which is likewise incorporated fluidically in an appropriate manner into the secondary circuit 8. The heating arrangement 10 is likewise an air/coolant heat exchanger of the type used to warm vehicle interiors.

It is self-evident that expressions such as "downstream" or "upstream" used below are each to be understood in relation to the direction of flow of the coolant. This is indicated both in FIG. 1 and the other figures by those parts of the split cooling system 2 represented symbolically as arrows.

According to the present disclosure, a control means 11 is provided which, in the present case, is situated downstream of the combustion engine 1, more specifically downstream of the cylinder head 4 and of the crankcase 3 of the combustion engine 1. In this case, the control means 11 is arranged on the side of the cylinder head 4. The control means 11 shown here is a directional control valve in the form of a proportional valve (proportional control valve) which, in the present case, has two internal passageways 12, 13 for the coolant in addition to a plurality of ports. In this case, the upper passageway 12 in the plane of the drawing is connected fluidically to the upper, i.e. outlet-side, cylinder head region 5, and the lower passageway 13 in the plane of the drawing is connected fluidically to the lower, i.e. inlet-side, cylinder head region 6.

The control means 11 furthermore contains a thermostat arrangement 14 and a control element 15, wherein the control element 15 can be embodied as a cylinder of revolution, for example. The control element 15 may also be referred to below as a cylinder of revolution 15 without this being intended to have a limiting effect. The control element 15 is mounted within the control means 11 in such a way that it can be rotated about its longitudinal axis by means of an actuator 16. The control element 15 may influence the passage of the coolant through the control means 11 and hence into the lines and/or pipes of the split cooling system 2 connected fluidically to the control means 11. For this purpose, the control element 15 has through bores (not shown specifically in FIG. 1) which correspond, in particular, to the two passageways 12, 13. In the present case, the control element 15 is in a first control position R1, in which flow of the coolant is prevented. More specifically, the onward progress of partial flows of coolant leaving the cylinder head 4 and the crankcase 3 is completely blocked in the first control position R1 shown here.

The control element 15 has a leakage channel 17, which extends between the otherwise shut-off upper passageway 12 of the control means 11 and the secondary circuit 8. The leakage channel 17 formed in the first control position R1 serves to ensure that a slight inflow of coolant from the upper, i.e. outlet-side, cylinder head region 5 into the secondary circuit 8 via the upper passageway 12 in the form of a trickling flow is made possible, despite the control means 11 being shut off. Said trickling flow should be considered in connection with a fail-proof function implemented in the control means 11 by means of the thermostat arrangement 14, as will be made clearer below.

In addition to the thermostat arrangement 14, there is a discharge line 18, which extends between the control means 11 and the main circuit 7. By means of its fluidic connection to the control means 11 and the main circuit 7, the discharge line 18 serves as a bypass passage for the coolant when required. For this purpose, the control means 11 has, in the region of its lower passageway 13, an opening by which a fluidic connection can be established between the lower passageway 13 and the discharge line 18. In normal operation, said opening is closed by means of a closure of the thermostat arrangement 14, said closure being spring-loaded for example.

The first control position R1 shown here serves for the quickest possible attainment of the operating temperature of the combustion engine 1, especially from a cold start. Owing to the shutting off of the flow of coolant by means of the control means 11, the crankcase 3 and the cylinder head 4, together with the engine oil situated therein (not visible specifically), can be heated up within a very short time after starting. This may be the case in a phase where there is no demand for heating by means of the heating arrangement 10, as shown here. The reason for the rapid warm-up is the absence of heat energy loss to inflowing cooler coolant when the coolant is stationary.

Although a small proportion of coolant heated by means of the upper, i.e. outlet-side, cylinder head region 5 can pass via the secondary circuit 8 toward the heating arrangement 10 owing to the trickling flow through the leakage channel 17 in the first control position R1, the heat energy is not sufficient for a high heating demand. On the contrary, the trickling flow serves to supply the thermostat arrangement 14 continuously with a weak flow of coolant (not cooled by being stationary), even when the control means 11 is shut off.

Behind this there lies the provision of a fail-proof function, which triggers an appropriate response when there is a risk of overheating of the coolant and/or of the combustion engine 1. This is because the at least slight inflow to the thermostat arrangement 14 ensures that the latter is supplied continuously with coolant which is at the current temperature of the coolant in the upper cylinder head region 5. Since the upper cylinder head region 5 already belongs to the hottest or most quickly warmed region of the combustion engine 1, owing to the exhaust gas outlets (not shown specifically) arranged therein, the temperature currently present therein is crucial for such monitoring.

If the attainment or exceeding of a predefined temperature of the coolant is then detected by the thermostat arrangement 14, it opens its closure, which closes the opening in the lower passageway 13 of the control means 11, with the result that coolant can as it were bypass the control element 15 via the discharge line 18 and enter the main circuit 7 directly and hence reach the cooler arrangement 9. As a result, the thermostat arrangement 14 can in this way assume a failure-compensating function. Any overheating of the combustion engine 1 can thereby be reliably prevented if the control means 11 does not open as required in the case of need and thus does not itself ensure a sufficient coolant flow, in particular to the cooler arrangement 9.

Thus, the control element 15 may be in the R1 position in response to an engine with a temperature less than a desired operating temperature range (e.g., 180-200° F.) and an absence of a vehicle heating demand. The control element 15 in the R1 position enables coolant from the split cooling system 2 to flow into the upper side 5 and into the crankcase 3 while it prevents a majority of coolant from flowing to the main 7 and secondary 8 circuits. In this way, a majority of coolant flow may be described as blocked and/or substantially stagnant. A small amount of coolant trickles to the thermostat arrangement 14 such that a coolant temperature, and therefore an engine temperature, may be monitored to provide a failure-compensating function. In this way, if a temperature of the coolant trickling to the thermostat arrangement 14 is greater than the desired temperature range of the engine, then the control element 15 may move to a position outside of R1 in order to prevent degradation of the engine by allowing coolant to flow to one or more of the main 7 and secondary 8 circuits.

It is evident that, in the present case, there are further components for the combustion engine 1 according to the present disclosure having the split cooling system 2 according to the present disclosure, these being a coolant pump 19, an expansion tank 20 and an oil cooler 21.

The coolant pump 19 is used to circulate the coolant through the coolant jacket of the combustion engine 1 and through the split cooling system 2. For this purpose, the coolant pump 19 is situated upstream of the combustion engine 1, being arranged directly on the crankcase 3 thereof. Thus, the coolant pump 19 is integrated into the main circuit 7, wherein a further feed line 22 is provided, which fluidically connects the coolant pump 19 and the upper cylinder head region 5 directly to one another. As a result, some of the coolant flow can pass into the coolant jacket of the cylinder head 4 directly via the feed line 22 while bypassing the crankcase 3, i.e. the engine block.

The expansion tank 20 serves to receive excess coolant from the split cooling system 2 and dispense required coolant to the split cooling system 2, and to discharge gaseous constituents of the coolant. For this purpose, the expansion tank 20 is connected fluidically to the cooler arrangement 9 by a first receiving line 23, while there is a further fluidic connection via a compensating line 24, which extends between the expansion tank 20 and a bypass 25. The bypass 25 is a line (shown via a thick line similar to main circuit 7) with a large internal cross section, through which a relatively large quantity of coolant, after passing through the coolant jacket of the combustion engine 1, can be fed back into said jacket while bypassing the cooler arrangement 9 and the heating arrangement 10. For this purpose, the bypass 25 extends between the control means 11 and the coolant pump 19, wherein the bypass 25 and the main circuit 7 initially come together upstream of the coolant pump 19, at a node 26, to which they are fluidically connected.

In the present case, there is furthermore an EGR system 27, which is integrated fluidically into the secondary circuit 8. Here, the EGR system 27 is arranged upstream of the heating arrangement 10. In this position, the EGR system 27 is designed to initially cool some of the exhaust gas before it is fed to the combustion air of the combustion engine 1. It is thereby possible to improve the exhaust figures for the combustion engine 1 in a manner known per se. The waste heat available here can now be transferred in an advantageous manner to the coolant in the secondary circuit 8, where it can be used to heat the vehicle interior, when required, by means of the downstream heating arrangement 10. In addition, the EGR system 27 is connected fluidically to the expansion tank 20 by a second receiving line 28 in order to be able to carry some of the coolant thus heated and, in the process, expanded into the expansion tank 20 when required.

In other embodiments of the split cooling system 2, it may be advantageous to integrate the oil cooler 21 into the secondary circuit 8 as an additional heat exchanger. In this case, the oil cooler 21 can transfer heat energy from the warmed coolant in the secondary circuit 8 to the engine oil in the warm-up phase. This is advantageous particularly when no heat is being dissipated by the heating arrangement 10. In this case, the temperature of the coolant in the secondary circuit 8 would exceed a threshold value relatively quickly, with the result that the "no flow strategy" in the crankcase 3, i.e. in the engine block, would have to be ended prematurely or that coolant would have to be passed to the cooler arrangement 9. In this way, the excess heat energy from the secondary circuit 8 can be used to heat the engine oil more quickly.

FIG. 2 shows such an alternative embodiment of the embodiment of FIG. 1, in which the oil cooler 21 is integrated in parallel into the secondary circuit 8, between an outlet of the cylinder head 4, in particular of the upper cylinder head region 5, and the control means 11.

FIG. 3 shows another alternative embodiment of the embodiments of FIG. 1 or 2, in which the cylinder head 4, in particular the upper cylinder head region 5, and the oil cooler 21 are connected in series.

In respect of FIGS. 4 to 8, which will be explained below, it should be noted that the further explanations in this regard apply to all the alternative embodiments, previously shown in FIGS. 1 to 3, as regards the arrangement of the oil cooler 21.

Figure 4:
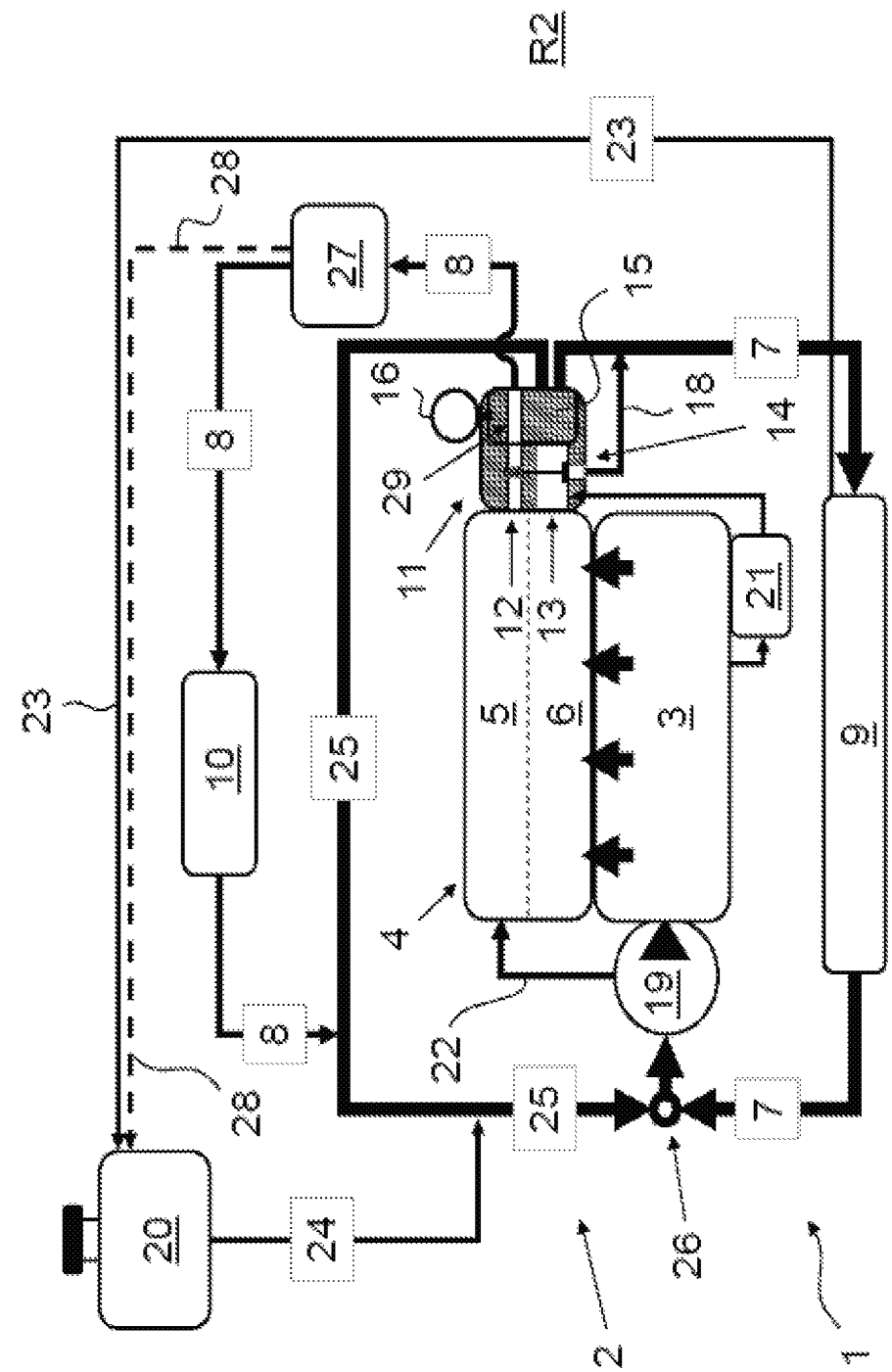
FIG. 4 shows the schematic illustration from FIG. 1 in a changed control position of one component of the split cooling system according to the present disclosure in the case of a demand for heating.

Thus, FIG. 4 shows a second possible control position R2 of the control means 11, in which the previously shut off position has been abandoned and a coolant flow has been made possible. This position was assumed by the control element 15 of the control means 11 being turned partially about its longitudinal axis by means of the actuator 16. As can be seen, one bore of the through bores 29, already discussed above, of the control element 15, said bore being at the top in the plane of the drawing, now forms an extension of passageway 12 of the control means 11, said passageway being at the top in the plane of the drawing. In other words, the upper passageway 12 and the upper through bore 29 are now connected fluidically to one another in such a way that coolant flowing through the coolant jacket of the upper, i.e. outlet-side, cylinder head region 5, in particular, can flow into the secondary circuit 8.

The second control position R2 of the control means 11 serves to continue to bring about as rapid as possible warming up of the combustion engine 1 while there is a need to meet a moderate demand for heating by the heating arrangement 10. In this case, the portion of the coolant in the upper, i.e. outlet-side, cylinder head region 5, which is already the warmest in comparison with the rest of the coolant, is used to warm the vehicle interior by means of the heating arrangement 10, while the coolant stream continues to remain without flow in relation to the coolant jackets of the lower, i.e. inlet-side, cylinder head region 6 and of the crankcase 3. A loss of heat energy in the last-mentioned regions is thereby avoided, with the result that these continue to undergo rapid heating. Thus, the split coolant circuit may provide rapid heating for the engine while providing vehicle heating in the second control position R2 by flowing coolant from the upper side 5, through the upper passageway 12, though the upper through bore 29, and into the secondary coolant circuit 8. Coolant from the crankcase 3 and lower cylinder head region (lower side) 6 remain stagnant and do not mix with coolant from the upper side 5.

Figure 5:
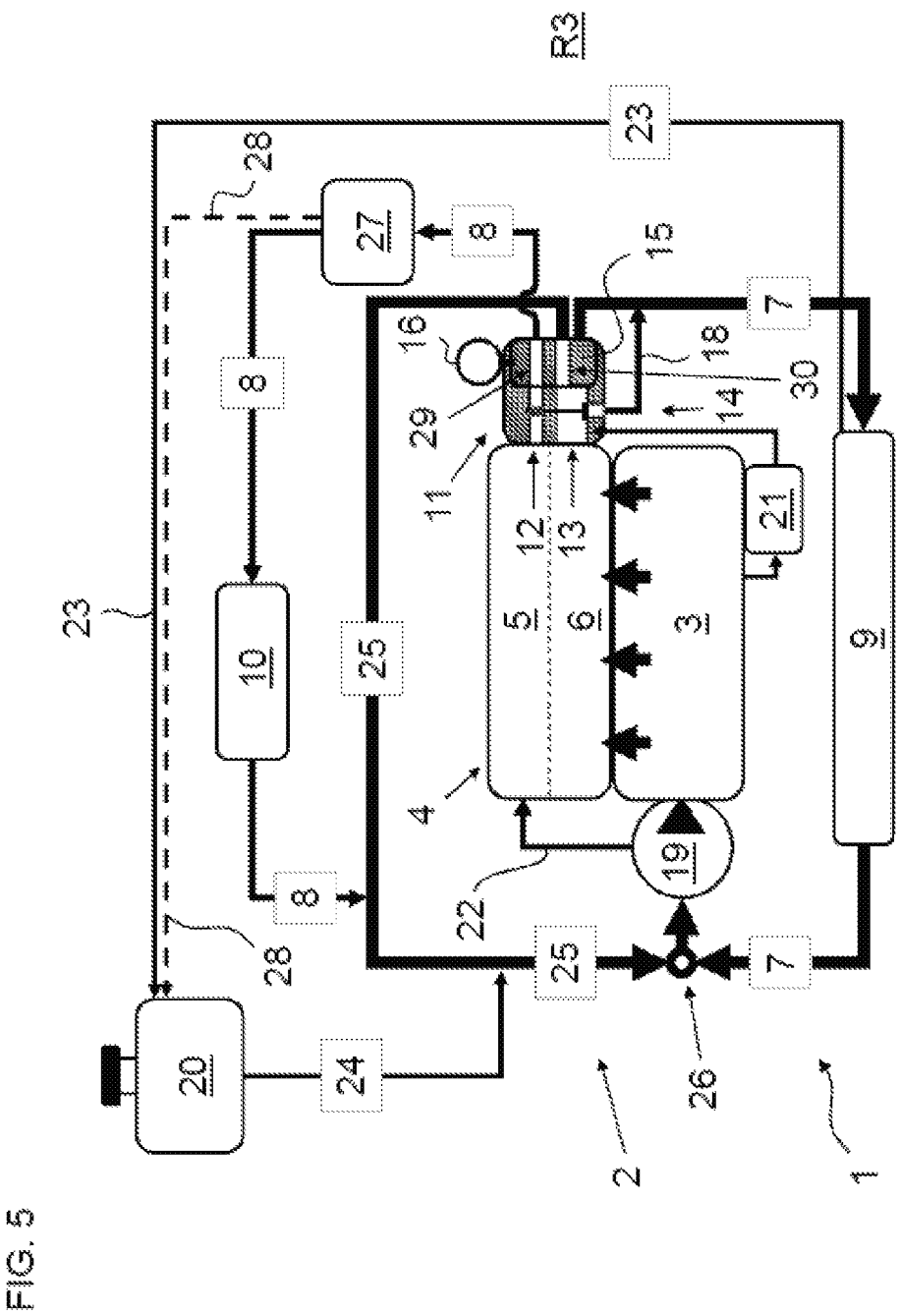
FIG. 5 shows the schematic illustration from FIGS. 1 and 4 in another control position of said component of the split cooling system according to the present disclosure during a demand for heating.

FIG. 5 shows a third possible control position R3 of the control means 11, which has been assumed through a further rotation of the cylinder of revolution 15 by means of the actuator 16. As is evident, the upper through bore 29 of the cylinder of revolution 15 is now complemented in the third control position R3 by a further through bore 30, which is in the center in the plane of the drawing. The central through bore 30 now additionally makes available a fluidic connection between the lower passageway 13 of the control means 11 and the bypass 25. In the third control position R3, a moderate demand for heating by the heating arrangement 10 can consequently continue to be met, while, owing to increasing temperatures of the rest of the coolant, the latter can be partially fed back directly into the coolant jacket of the combustion engine 1 via the bypass 25. As uniform as possible warming up of the combustion engine 1 is thereby made possible since the heat energy is distributed uniformly over the entire coolant jacket of the combustion engine 1 by the coolant. Thus, when the control means 11 is in the third position, coolant from the cylinder head 4 (upper side 5 and inlet side 6) may flow through the bypass 25 and back to engine 1, where the coolant may enter the cylinder head 4 or the crankcase 3, while allowing coolant from the upper side 5 to be used to provide vehicle heating. By doing this, position R3 may provide more uniform heating of the engine 1 in conjunction with vehicle heating by flowing coolant from the upper side 5, through the upper passageway 12, through the upper through bore 29, and into the secondary circuit 8 to provide vehicle heating while coolant from the lower side 6 and the crankcase 3 flow through the lower passageway 13, through the central through bore 30, and into the external bypass 25.

Figure 6:
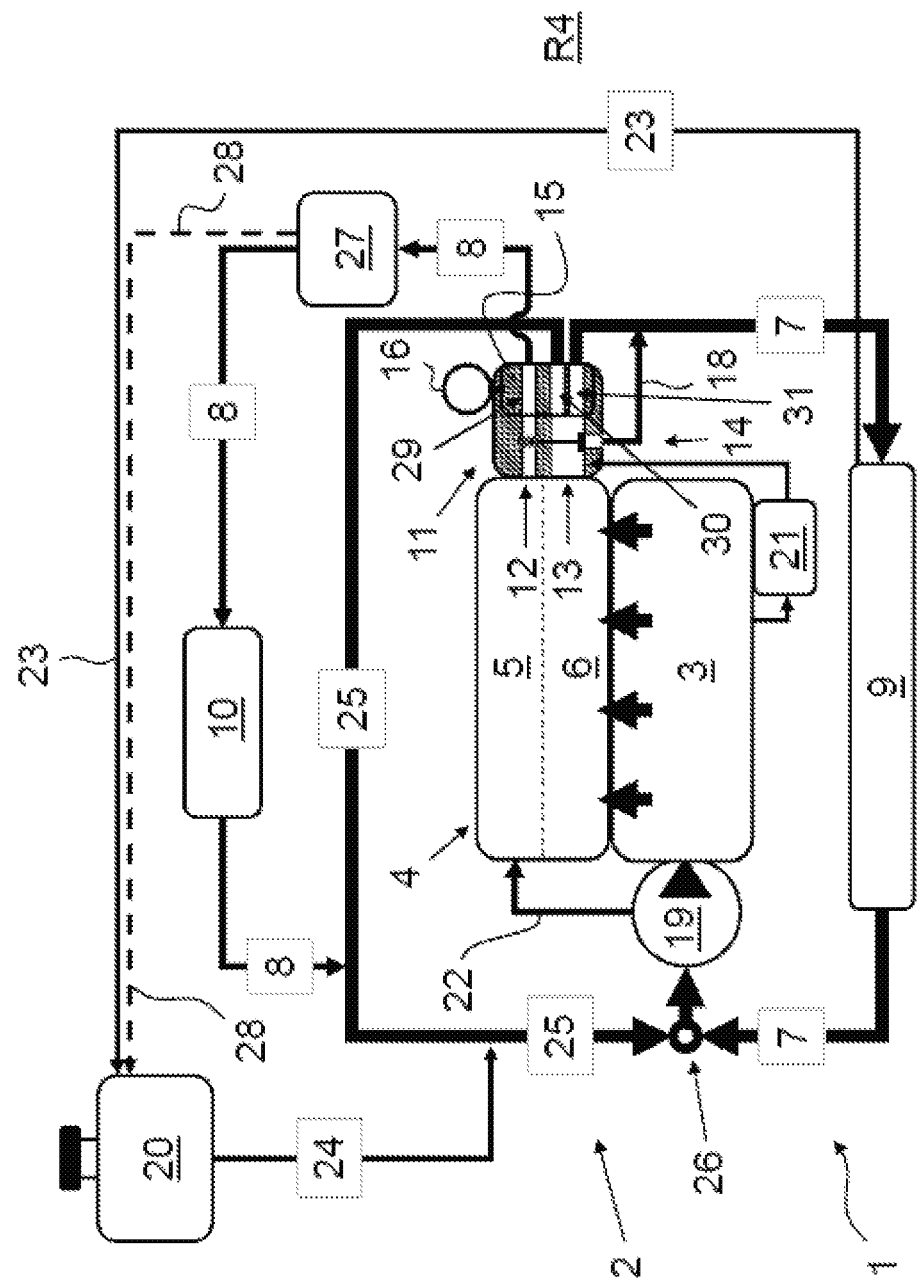
FIG. 6 shows the schematic illustration from FIGS. 1, 4, and 5 in another control position of said component of the split cooling system according to the present disclosure during the demand for heating with cooling of the coolant.

FIG. 6 shows a fourth possible control position R4 of the control means 11, which has once again been set by means of a further rotation of the cylinder of revolution 15 by the actuator 16. This then comprises the provision of a further through bore within the cylinder of revolution 15 in the form of a lower through bore 31. As is evident, the lower through bore 31 is capable of additionally establishing a fluidic connection between the lower passageway 13 of the control means 11 and the main circuit 7. As a result, some of the coolant leaving the coolant jacket of the combustion engine 1 can then also be fed to the cooler arrangement 9.

The fourth control position R4 of the control means 11 serves not only to allow uniform distribution of the coolant via the coolant jacket of the combustion engine 1 and to meet a moderate demand for heating by the heating arrangement 10 but also to allow cooling of the coolant by means of the cooler arrangement 9. Thus, the fourth control position R4 can preferably be assumed when the operating temperature of the combustion engine 1 has been attained and a vehicle heating request is present. Coolant from the upper side 5 flows through the upper passageway 12, through the upper through bore 29, and into the secondary circuit 8 while coolant from the lower side 6 and the crankcase 3 flows through the lower passage way 12, through the lower through bore 30, and through one or more of the central through bore 30 and the lower through bore 31 into the bypass 25 and the main circuit 7 respectively.

Figure 7:
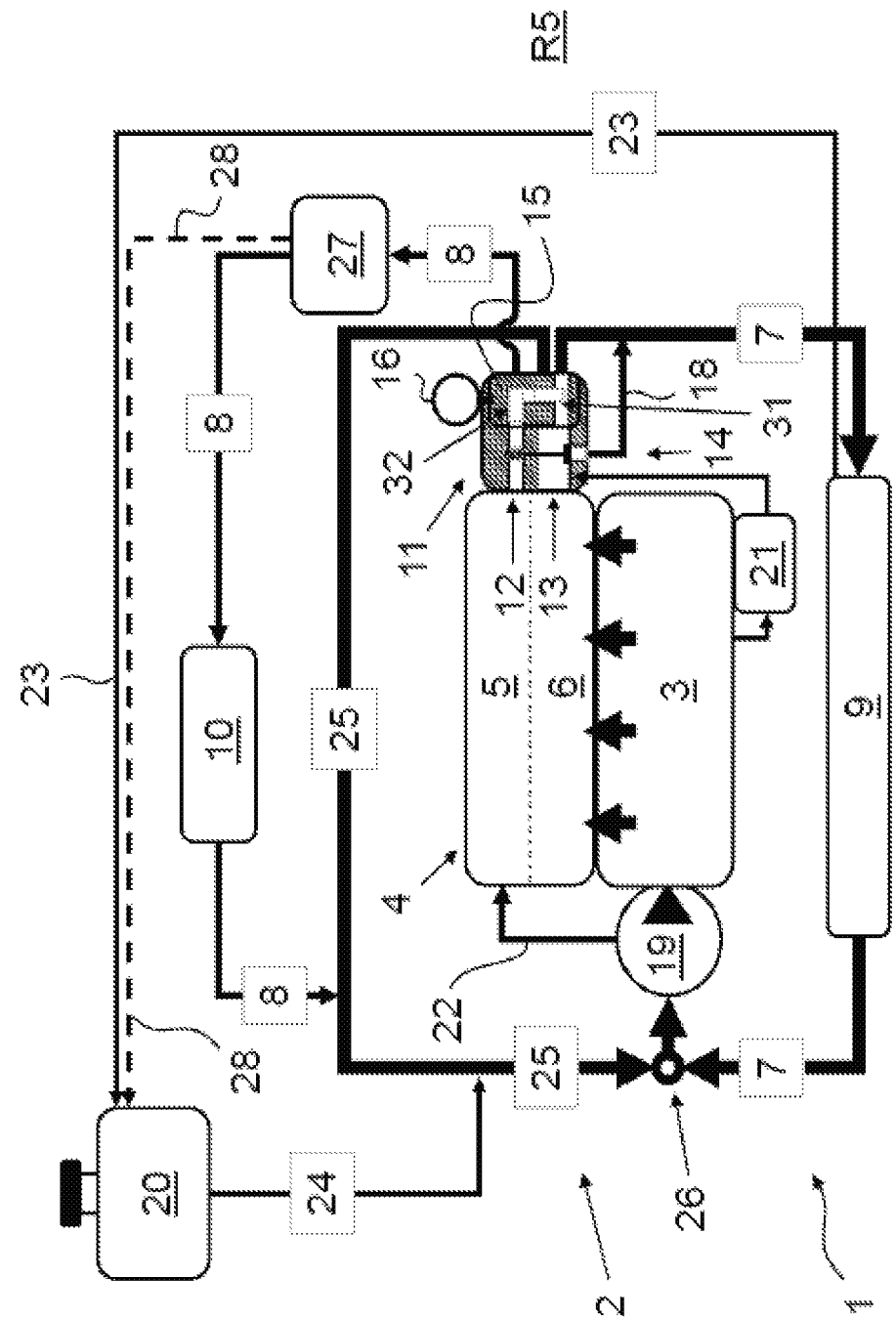
FIG. 7 shows the schematic illustration from FIGS. 1 and 4 to 6 in another control position of said component of the split cooling system according to the present disclosure with a maximum cooling capacity.

FIG. 7 shows a fifth control position R5 of the control means 11, which can likewise be assumed by a further rotation of the cylinder of revolution 15 by means of the actuator 16. The fifth control position R5 comprises the provision of an internal first bypass 32 arranged within the cylinder of revolution 15. As is evident, this is designed to connect the upper passageway 12 of the control means 11 fluidically to the lower through bore 31 of the cylinder of revolution 15. In this position, a total partial flow of coolant leaving the cylinder head 4 and the crankcase 3 can be passed directly into the main circuit 7 and hence toward the cooler arrangement 9.

Since there is bypassing of the heating arrangement 10 in the fifth control position R5 and the entire coolant flow flowing around the combustion engine 1 is then passed to the cooler arrangement, a decidedly advantageous maximum cooling capacity for the combustion engine 1 can thereby be achieved, despite the presence of a split cooling system 2. In this way, coolant is combined in the presence of an engine cooling demand and in the absence of a vehicle heating demand. The engine cooling demand may occur in response to an engine temperature exceeding the desired operating temperature range of the engine.

Coolant from the upper side 5 flows through a first internal bypass 32 and is directed to the lower through bore 31, where the coolant from the upper side 5 mixes with coolant from the lower side 6 and the crankcase 3 within the control means 11, and where the mixture of coolant flows through the lower through passage 31 and into the main coolant circuit 7. Thus, all of the coolant flows through the main circuit to provide increased engine cooling. The mixture is separated at the coolant pump 19 where coolant is directed to either the upper side 5 or the crankcase 3.

Figure 8:
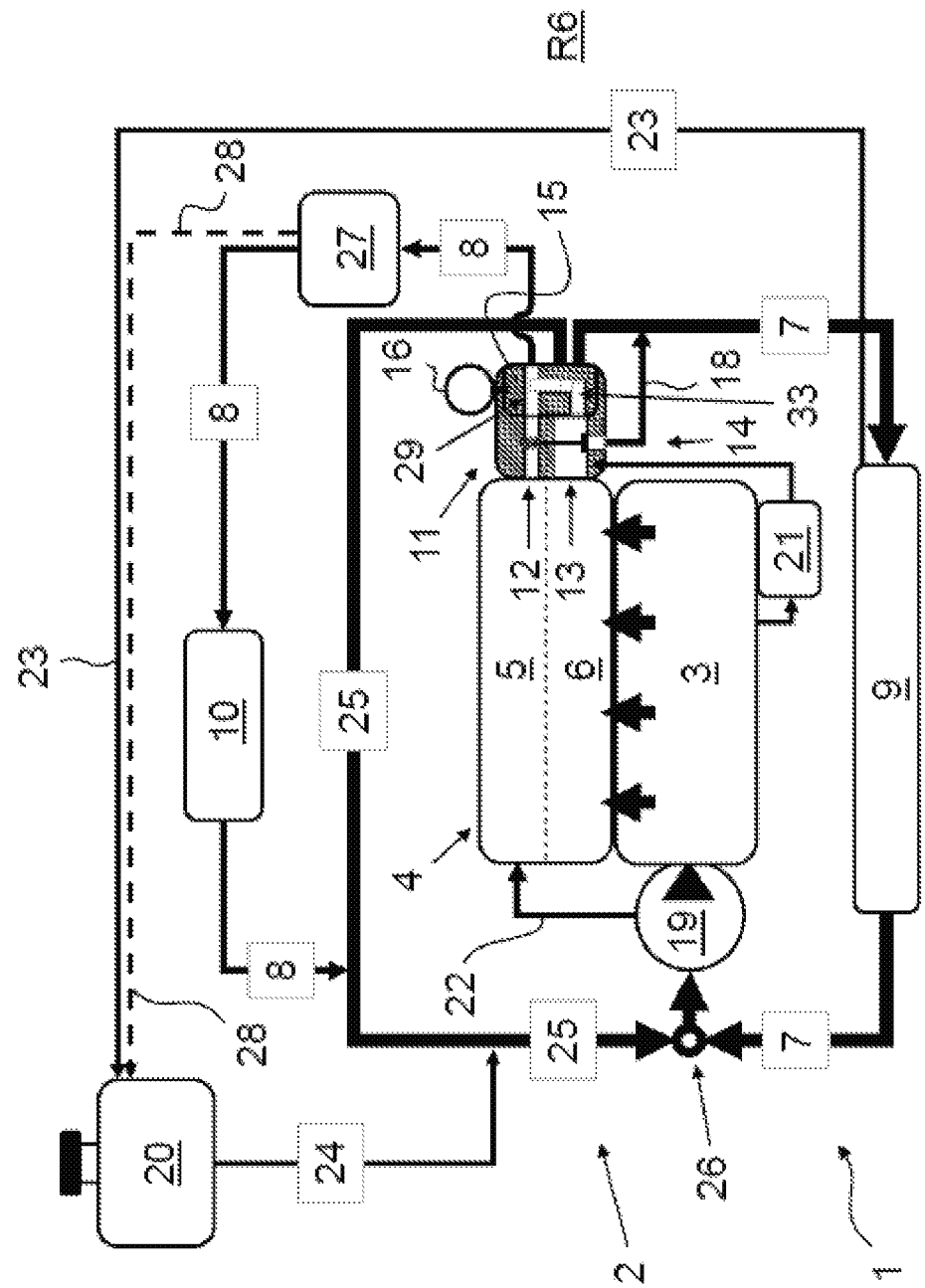
FIG. 8 shows the schematic illustration from FIGS. 1 and 4 to 7 in a final control position of said component of the split cooling system according to the present disclosure with a maximum heating capacity.

FIG. 8 shows a sixth control position R6 of the control means 11. As also previously, this has been assumed through further rotation of the cylinder of revolution 15 by means of the actuator 16. As is evident, there is now an internal second bypass 33, which is likewise formed within the cylinder of revolution 15, in the sixth control position R6. The second bypass 33 is designed to establish a fluidic connection between the lower passageway 13 of the control means 11 and the upper through bore 29 of the cylinder of revolution 15. The partial flows of coolant leaving the crankcase 3 and the cylinder head 4 can thus be carried jointly in the direction of the heating arrangement 10. In this way, the entire coolant flow flowing around the combustion engine 1 can now be carried directly, bypassing the cooler arrangement, toward the heating arrangement 10.

The sixth control position R6 of the control means 11 may be used in phases in which a maximum heating capacity is demanded by the heating arrangement 10. Since in this case the heated coolant serves exclusively to supply the heating arrangement, the heating arrangement can then be used at least temporarily for maximum warming of the vehicle interior. At the same time, cooling of the coolant also takes place, this taking place not via the cooler arrangement 9 to the external ambient air but via the heating arrangement 10 into the vehicle interior.

Coolant from the crankcase 3 flows into the lower side 6, where the coolant flows through the lower passageway 13, through a second internal bypass 33, and into the upper through bore 29 where the coolant from the crankcase mixes with coolant from the upper side 5. The mixture flows through the upper through bore 29 into the secondary circuit 8 where the mixture provides increases vehicle heating.

Thus, the control means described above comprises two inlets, an upper passageway fluidly coupled to an upper side of a cylinder head and a lower passageway fluidly coupled to a lower side of the cylinder head. The upper side receives coolant from a coolant pump while the lower side receives coolant from a crankcase of an engine. The coolants in the upper side and lower side do not mix in the engine. The upper passageway is fluidly coupled to an upper through bore of the control means which is fluidly coupled to a secondary coolant circuit comprising a vehicle heating arrangement. The lower passage way is fluidly coupled to a central through bore and a lower through bore of the control means. The central through bore is fluidly coupled to an external bypass and the lower through bore is fluidly coupled to a main coolant circuit, where the main coolant circuit comprises a cooling arrangement. The control means further comprises a first internal bypass for directing coolant from the upper through bore to the lower through bore. In this way, coolant from the upper side may mix with coolant from the lower side and/or crankcase in the lower through bore. The control means further comprises a second internal bypass for directing coolant from the lower through bore to the upper through bore. In this way, coolant from the lower side may mix with coolant from the upper side in the upper through bore. The coolant mixture in the lower through bore may provide increased vehicle cooling whereas the coolant mixture in the upper through bore may provide increased vehicle heating.

FIG. 9 shows a control means 100 according to the present disclosure for a split cooling system, which may be used to cool a combustion engine and to heat the interior of a motor. The control means 100 may be used similarly to control means 11 in the embodiments of FIGS. 1-8.

The combustion engine used is divided in a conventional manner into a crankcase, i.e. an engine block, and a cylinder head, wherein the cylinder head can furthermore be divided into an upper, i.e. outlet-side, cylinder head region and a lower, i.e. inlet-side, cylinder head region. Both the crankcase and the cylinder head are surrounded at least partially (in a manner not shown specifically) by a coolant jacket, through which a coolant (not visible specifically) that can be circulated within the split cooling system can be passed.

For this purpose, the split cooling system comprises a main cooling circuit and a secondary cooling circuit. The two circuits can be ducts, lines, pipes, and/or hoses.

A cooler arrangement (not shown specifically) is integrated into the main circuit and is connected fluidically in an appropriate manner to the main circuit. The cooler arrangement can be an air/coolant heat exchanger of the type used to cool liquid-cooled combustion engines. In contrast, the secondary circuit has a heating arrangement (likewise not visible specifically), which is integrated into said secondary circuit and which is likewise incorporated fluidically in an appropriate manner into the secondary circuit. The heating arrangement can likewise be an air/coolant heat exchanger of the type used to warm vehicle interiors.

The control means 100 itself comprises a housing 102, in which a body of revolution 103 is arranged. In the present case, the body of revolution 103 has the form of a cylinder of revolution. The body of revolution 103 is designed in such a way that it can be rotated about its longitudinal axis x within the housing 102. In this case, the body of revolution 103 can adopt a plurality of control positions by its rotation R, of which in the present case a first control position R1 is shown. The body of revolution 103 can be driven by means of an actuator 104 in order to adopt the respectively desired control position or an intermediate position situated in between. The actuator may rotate the body of revolution 103 based on signals sent by a controller 190. The controller 190 receives signals from a temperature measuring device in the housing 102 and determines a desired position of the body of revolution 103 based on a temperature measured.

The housing 102 has a plurality of openings, which are used to introduce and discharge coolant. With reference to the illustration in FIG. 9, two inlets are arranged on the left-hand side of the housing 102, being divided in the plane of the drawing into a first inlet E1 situated at the top and a second inlet E2 situated below the latter. In contrast, a total of three outlets are shown on the right-hand side of the housing 102, said outlets being divided in the plane of the drawing into a first outlet A1 situated at the top and a second outlet A2 situated at the bottom, while a third outlet A3 is arranged between the first outlet A1 and the second outlet A2.

The first inlet E1 is provided for fluidic connection to the coolant jacket of the cylinder head or at least to an upper, i.e. outlet-side, portion of the cylinder head. The coolant flow that can come from there is denoted in the present case by K1. The second inlet E2 is furthermore designed for fluidic connection to the coolant jacket of the crankcase, i.e. the engine block, or in addition to a lower, i.e. inlet-side, portion of the cylinder head of the combustion engine. The coolant flow that can come from there is denoted in the present case by K2.

In respect of the outlets of the housing 102, the first outlet A1 is provided for fluidic connection to the secondary circuit. The coolant flow that can emerge from there is denoted in the present case by K3. The second outlet A2 is furthermore provided for fluidic connection to the main circuit. The coolant flow that can emerge from there is denoted in the present case by K5.

Finally, the third outlet A3 is provided for fluidic connection to an external bypass of the split cooling system. Said external bypass serves to circulate the coolant through the coolant jacket or coolant jackets of the combustion engine. The coolant flow that can emerge from there is denoted in the present case by K4.

As is apparent, a thermostat arrangement 105, which in the present case comprises a temperature-sensitive spring element 106 and a closure means 107, which are coupled to one another in a force-transmitting manner by a coupling rod 108, is arranged in the housing 102. Formed in the region of the second inlet E2, within the housing 102, is a valve opening 109, which is connected fluidically to the second inlet E2. As is apparent, the closure means 107 of the thermostat arrangement 105 is arranged in the region of the valve opening 109 in such a way that the valve opening 109 can be both closed and opened by means of the closure means 107.

The valve opening 109 is provided for fluidic connection to the main circuit of the split cooling system, e.g. via a discharge line (not shown specifically). In the normal state, the valve opening 109 is closed by the thermostat arrangement 5, more precisely by the closure means 107 thereof. Particularly on the basis of the temperature-sensitive spring element 106, the thermostat arrangement 105 is designed to open the valve opening 109 to allow the coolant to be carried onward into the main circuit when the outlets A1, A2, A3 are at least partially closed and a threshold temperature for the coolant is also being exceeded. This is accomplished by opening the valve opening 109 by correspondingly raising the closure means 107 out of said opening.

Considering the body of revolution 103, a trickling flow of coolant of coolant flow K1 via the first inlet E1 and out of the first outlet A1 is made possible in the control position R1 shown here. For this purpose, the body of revolution 103 has a leakage channel 110 arranged in the wall thereof. To clarify this, the body of revolution 103, which is otherwise shown unsectioned, is shown in a partial section in the region of the leakage channel 110. Through the leakage channel 110, there is a continuous coolant flow K1, K3 despite the outlets A1, A2, A3 being shut off by the control means 100, as a result of which, in particular, the thermostat arrangement 105 is supplied continuously with up-to-date temperatures of the coolant flow K1 coming from the cylinder head. A fail-proof function is thereby established by means of the thermostat arrangement 105, which opens the valve opening 109 when there is a risk that the combustion engine will overheat. In this way, at least the coolant flow K2 coming from the crankcase can be passed onward into the main circuit of the split cooling system, via which it reaches the cooler arrangement arranged therein.

The body of revolution 103 can preferably be designed in such a way that the first inlet E1 is in each case open in a manner not shown specifically in the individual control positions R1-R6 of the body of revolution 103. For this purpose, the body of revolution 103 can have corresponding openings in the wall thereof, for example, said openings allowing at least an inflow of coolant flow K1 into the body of revolution 103.

FIG. 10 illustrates schematically the individual phases Ph1 to Ph5 during the operation of the combustion engine and the associated control positions R2 to R6.

Phase Ph1 is distinguished by a heating demand of the heating arrangement in the warm-up phase of the combustion engine. In this phase, the second control position R2, in which inlet E1 and outlet A1 are connected fluidically to one another, has been adopted. In this way, the coolant flow K1 coming from the cylinder head can pass into the secondary circuit as coolant flow K3 through the control means 1. The heat energy already contained in the coolant flow can thereby be passed to the heating arrangement. A likewise possible arrangement of an EGR system (not shown specifically) within the secondary circuit can additionally serve to meet the heating demand by way of the heating arrangement. In the second control position R2, the second inlet E2 connected to the main circuit by the second and third outlets A2, A3 is closed, with the result that at least the coolant flow K2 of the coolant jacket of the crankcase, i.e. of the engine block, is at rest.

Phase Ph2 is reached with increasing warm-up of the combustion engine, in which phase the third control position R3 is adopted in an example. In this position, the third outlet A3 and inlet E2 are open in addition to the open first outlet A1, with the result that the coolant flows K1 and K2 coming from the cylinder head and from the crankcase, i.e. the engine block, can be passed into the external bypass as coolant flow K4 and, as before, into the secondary circuit as coolant flow K3. It is thereby possible both for a heating demand to be met and for circulation of the coolant to take place in relation to the combustion engine.

Phase Ph3 starts as soon as the operating temperature of the combustion engine is reached and cooling is necessary. In this phase, the fourth control position R4 of the body of revolution 103 is adopted, with the result that the second outlet A2 is then open in addition to the first outlet A1 and the third outlet A3. In this way, the coolant flows K1 and K2 coming from the cylinder head and from the crankcase can continue to be introduced into the external bypass as coolant flow K4 and into the secondary circuit as coolant flow K3 and additionally into the main circuit as coolant flow K5. Some of the coolant is thereby passed through the cooler arrangement, and therefore there is cooling of the coolant and hence of the combustion engine.

Phase Ph4 shows a state which brings about a maximum cooling capacity for the combustion engine. In the fifth control position R5 adopted here, the first and third outlets A1, A3 are closed, while the second outlet A2 connected fluidically to the main circuit is open. At the same time, the first inlet E1 and the second inlet E2 are connected fluidically to one another via an internal connection 111 in the body of revolution 103. This is possible through a substantially hollow design of the body of revolution 103 in combination with corresponding openings arranged through the wall of said body. In this way, the coolant flows K1, K2 coming from the entire coolant jacket of the combustion engine are combined and passed on as coolant flow K5 only into the main circuit, where they flow through the cooler arrangement. In other words, all the coolant is thereby directed toward the cooling arrangement, allowing maximum cooling to take place.

Phase Ph5 shows a state in which there is a maximum heating demand. In this phase, the sixth control position R6 is adopted, in which the second and third outlets A2, A3 are closed, while the first outlet A1 is fully open. On the inlet side, once again, both the first inlet E1 and the second inlet E2 are open. Once again, the coolant flows K1, K2 coming from the combustion engine are now combined in such a way via the internal connection 111 that they are passed on jointly into the secondary circuit as coolant flow K3 via the first outlet A1. It is thereby possible to use all the heat energy contained in the coolant for at least partial release to the heating arrangement.

FIG. 11 shows a diagram which illustrates the individual phases Ph1-Ph5 in relation to a continuously variable rotational position P of the body of revolution 103 in percent (%) in terms of its control positions R1-R6 and a rate of flow V, prevailing during said phases, of the coolant in liters per minute (l/min). The individual curves comprise a first curve W1 for the measurement location at a coolant pump of the split cooling system, a second curve W2 for the measurement location within the secondary circuit of the split cooling system and a third curve W3 for the measurement location within the external bypass of the split cooling system. A fourth and last curve W4 represents the measurement location of the cooler arrangement within the main circuit. Points on each of the curves is represented by a different shape, where diamonds are used for W1, squares are used for W2, triangles are used for W3, and pluses are used for W4.

The rotational position P with the value 0 shows an initial position 112 of the body of revolution 103, which can also be referred to as the first control position R1. As is evident, there is only a slight trickling flow within the secondary circuit in this rotational position P by virtue of the leakage channel 110. With increasing rotation R of the body of revolution 103 into further rotational positions P, the rate of flow V of the coolant in the region of the coolant pump rises steeply, especially from the second phase Ph2 in the third control position R3, until it reaches its maximum in the fourth phase Ph4 in the fifth control position R5. It is also here that the maximum rate of flow of the coolant within the cooler arrangement occurs. The graphical gaps between the fourth phase Ph4 and the third phase Ph3 and between the fourth phase Ph4 and the fifth phase Ph5 represent transitional phases 113, 114.

FIG. 12 shows a control means 200 according to the present disclosure for a split cooling which may be used to cool an internal combustion engine and to heat the interior of a motor vehicle. The control means 201 may be used similarly to control means 100 or control means 11 of FIG. 9 or FIGS. 1-8, respectively.

The used internal combustion engine is divided into an engine block and a cylinder head, the cylinder head possibly being divided further into an upper, i.e. outlet-side cylinder head region and a lower, i.e. inlet-side cylinder head region. Both the engine block and the cylinder head are surrounded at least in regions by a coolant jacket in a manner not shown in greater detail, through which coolant jackets a coolant, which can be circulated within the split cooling system and is not further visible, can be conveyed.

The split cooling system for this purpose comprises a primary circuit and a secondary circuit. Both circuits may fundamentally be channels, lines, pipes, and/or tubes.

A cooler arrangement (not shown in greater detail) is integrated in the primary circuit and is accordingly fluidically connected to the primary circuit. The cooler arrangement may be an air-coolant heat exchanger, as may be used to cool liquid-cooled internal combustion engines. By contrast, the secondary circuit has a heating arrangement integrated therein and likewise not visible in greater detail, which likewise is incorporated accordingly fluidically into the secondary circuit. The heating arrangement may also be an air-coolant heat exchanger, as may be used in order to heat vehicle interiors.

The control means 200 comprises a housing 202, in which a rotary body 203 is arranged. For this purpose the housing 202 has an inner chamber, which is divided into a front chamber 204 and a rear chamber 205. With reference to the illustration of FIG. 12, the housing 202 is shown in section for improved clarity, whereas the rotary body 203 is not illustrated in section.

Both chambers 204, 205 are arranged in succession in the direction of a longitudinal axis x of the rotary body 203 and are fluidically connected to one another. As can be seen, both the front chamber 204 and the rear chamber 205 have substantially a spherical shape. Here, both chambers 204, 205 transition into one another, in such a way that the respective spherical shapes thereof intersect one another at a sectional plane S running between said spherical shapes and extending perpendicularly to the longitudinal axis x of the rotary body 203.

In a shape-matched manner, the rotary body 203 in the present case at each end face has portions formed as circular segments in the selected view, wherein the circular segment in the region of the sectional plane S is larger than the opposite circular segment. The rotary body 203 is designed and mounted in such a way that it is rotatable about its longitudinal axis x within the housing 202. Here, the rotary body 203 may adopt a plurality of control positions R1-R6 via its rotation R, a first control position R1 being shown in the present case. Said further control positions will be discussed in greater detail hereinafter. The rotary body 203 can be driven via an actuator 206, in order to adopt the desired control position or an intermediate position disposed between said control positions.

The rotary body 203 is formed as a hollow body, of which the wall has a plurality of openings in the form of through-openings. Opposite, the housing 202 has a plurality of openings, which serve to allow coolant to be conveyed in and out. With reference to the illustration of FIG. 12, three outlets are arranged on the left-hand side of the housing 202 and are divided in the drawing plane into a first outlet A1 disposed at the top and a second outlet A2 disposed at the bottom and a third outlet A3 disposed therebetween. As can be seen, the outlets A1-A3 are arranged here in the present case about the longitudinal axis x of the rotary body 203 in a plane running parallel to the sectional plane S. Here, the individual outlets A1-A3 are disposed such that they are all arranged around the rear chamber 205 and are fluidically connected directly thereto. In other words the outlets A1-A3 are all arranged on a side face 207 of the housing 202 extending around the longitudinal axis x. Since the outlets A1-A3 are arranged accordingly on the housing 202 in a star-shaped manner as it were around the longitudinal axis x in the region of the rear chamber 205, the illustration of the first outlet A1 and of the third outlet A3 is reduced to the indication thereof via accordingly interrupted lines. As can be seen, the individual outlets A1-A3 are each arranged with a different orientation.

By contrast, a total of two inlets are located in the region of the front chamber 204, a first inlet E1 being arranged on a head side 208 of the housing 202. Said head side 208 is arranged here opposite the actuator 206. In other words the actuator 206 is arranged on a head side of the housing 202 that is opposite the head side 208 discussed here. It can be seen that the rotary body 203 is flattened toward the head side 208 having the first inlet E1. The smaller of the two circular segments is arranged here. In this embodiment the rotary body 203 is opened continuously toward the first inlet E1, such that a first coolant flow K1 can flow into the rotary body 203 in any control position thereof.

A further, second inlet E2 disposed likewise in the region of the front chamber 204 and directly fluidically connected thereto is arranged on the side face 207 of the housing 202. With reference to the illustration of FIG. 1, the second inlet E2 is disposed here at the top on the side face 207 of the housing 202 in the region of the front chamber 204.

The first inlet E1 is intended to be fluidically connected to the coolant jacket of the cylinder head or at least an upper, i.e. outlet-side portion of the cylinder head. The first coolant flow possibly arriving from here is designated K1 in the present case. The second inlet E2 is also designed to be fluidically connected to the coolant jacket of the engine block, i.e. of the engine block or additionally to a lower, i.e. inlet-side portion of the cylinder head of the internal combustion engine. The second coolant flow possibly arriving from here is designated K2 in the present case.

With respect to the outlets A1-A3 of the housing 202, the first outlet A1 is intended to be fluidically connected to the secondary circuit of the split cooling system containing the heating arrangement. The coolant flow possibly departing from here is designated K3 in the present case. The second outlet A2 is also intended to be fluidically connected to the primary circuit containing the cooler arrangement. The coolant flow possibly departing from here is designated K5 in the present case.

Lastly, the third outlet A3 is intended to be fluidically connected to an external bypass of the split cooling system. Said external bypass serves fundamentally to circulate the coolant through the coolant jacket or jackets of the internal combustion engine. The coolant flow possibly departing from here is designated K4 in the present case.

As can be seen, a thermostat arrangement 209 is disposed outside the housing 202 and in the present case comprises a temperature-sensitive spring element 210 and a closure means 211. The spring element 210 and closure means 211 are coupled to one another in a force-transmitting manner via a coupling rod 212, which likewise is disposed outside the housing 202. Furthermore, a diversion 213 arranged outside the housing 202 is provided and in the present case has a tubular design. The diversion 213 is fluidically connected to the second inlet E2. The diversion 213 has a valve opening 214, which corresponds with the closure means 211 of the thermostat arrangement 209. The valve opening 214 thus may be both opened and closed by the thermostat arrangement 209.

The valve opening 214 is intended to be fluidically connected to the primary circuit of the split cooling system, for example via a diversion not visible in greater detail. In the normal state the valve opening 214 is closed in a fluid-tight manner via the thermostat arrangement 209; more specifically via the closure means 211 thereof. In particular, on account of the temperature-sensitive spring element 210, the thermostat arrangement 209 is designed to release the valve opening 214 when the outlets A1, A2, A3 are at least partially closed and at the same time a maximum temperature for the coolant is overshot, in order to enable the coolant to be forwarded into the primary circuit. This is implemented by opening the valve opening 214 by lifting the closure means 211 therefrom accordingly.

With respect to the rotary body 203 a coolant trickle flow of the coolant flow K1 out from the first outlet A1 via the first inlet E1 is enabled in the first control position R1 shown here, although the second inlet E2 and all outlets A1-A3 are closed by the rotary body 203. For this purpose the rotary body 203 has a leak channel 216 arranged in wall 215. A continuous coolant flow K1, K3 through the leak channel 216 is provided by the control means 200 in spite of the blocked outlets A1-A3, whereby in particular the spring element 210 of the thermostat arrangement 209 is acted on continuously by the current temperature of the coolant flow K1 coming from the cylinder head, in particular form an upper, i.e. outlet-side cylinder head region.

A fail-proof function is thus established via the thermostat arrangement 209, which releases the valve opening 214 when there is a threat of overheating of the internal combustion engine. In this way at least the coolant flow K2 coming from the engine block can be forwarded into the primary circuit of the split cooling system, via which it reaches the cooler arrangement arranged therein.

As previously clarified, the rotary body 203 is formed in such a way that the first inlet E1 is open (in a manner not shown in greater detail) in each of the individual control positions R1-R6 of the rotary body 203. For this purpose the rotary body 203 for example may have one or more corresponding openings in its wall, which at least enable the coolant flow K1 to flow into the rotary body 203.

FIG. 13 shows a section through the rear chamber 205 of the control means 200 from FIG. 12. In this illustration the embodiment of the rotary body 203 within the housing 202 and the accordingly matched form thereof are illustrated. As can be seen, the rear chamber 205 and rotary body 203 each have a circular cross section, which is preferably adopted for the entire rotary body 203. The wall 215 of the rotary body 203 in the present case comprises two openings 217, 218 arranged therethrough, more specifically a first opening 217 and a second opening 218. In the first control position R1 shown here the openings 217, 218 of the rotary body 203 are disposed such that the outlets A1-A3 are closed by the wall 215. In other words the openings 217, 218 in the rotary body 203 are oriented here opposite the outlets A1-A3, in such a way that a flow of the coolant from the rear chamber 205 via at least one of the outlets A1-A3 is prevented.

The section shown here through the control means 200 also illustrates the star-shaped arrangement as it were of the individual outlets A1-A3 around the rear chamber 205 and the longitudinal axis x of the rotary body 203. With respect to a transverse axis y running horizontally in FIG. 13, the individual outlets A1-A3 are arranged offset relative thereto on the side face 207 of the housing 202 as follows:

Outlet A1 is rotated in a clockwise direction through 122.5° relative to the transverse axis y.

Outlet A2 is rotated in a clockwise direction through 267.5° relative to the transverse axis y.

Outlet A3 is rotated in a clockwise direction through 325° relative to the transverse axis y.

In the first control position R1 shown here an edge 219 of the first opening 217 in the rotary body 203 disposed to the left of a vertical axis z in FIG. 13 is visibly aligned with the transverse axis y. It goes without saying that at least one of the openings 217, 218 can be brought into alignment with at least one of the outlets A1-A3 by a rotation R of the rotary body 203, in such a way that a fluidic connection can be established between the rear chamber 205 and at least one of the outlets A1-A3.

Figure 14:
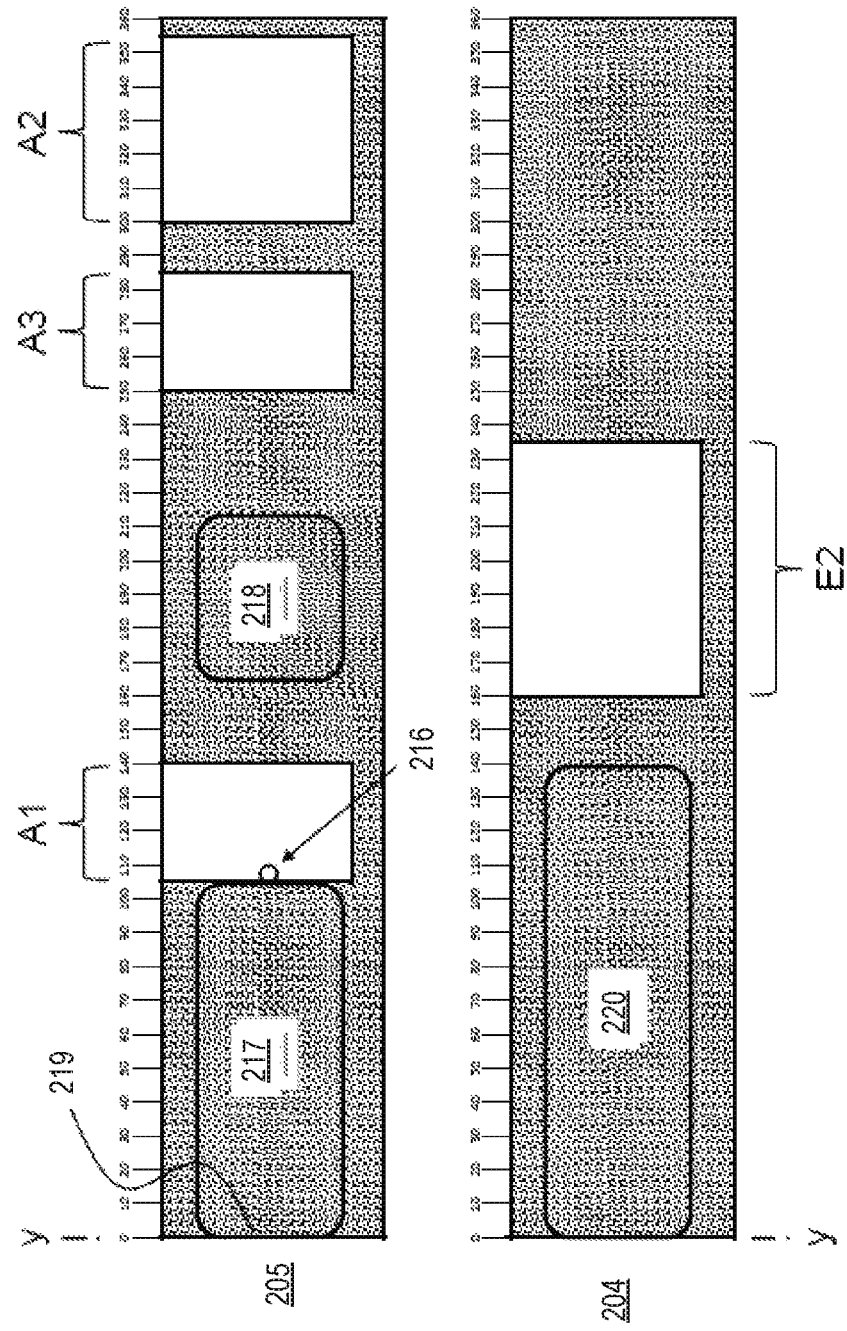
FIG. 14 shows a schematic illustration of the first control position of the control means from FIGS. 12 and 13 during an initial phase of an internal combustion engine.

FIG. 14 shows a schematic illustration of the cooperation of the openings 217, 218 in the rear chamber 205 with the outlets A1-A3 and also of a further opening 220 shown here in the region of the front chamber 204 with the second inlet E2. In the present case the first control position R1 visible here is occupied in an initial phase Ph0 of an internal combustion engine operated with the control means 200. It should again be reminded at this juncture that the coolant flow K1 shown in FIG. 12 in principle may enter the interior of the control means 200 in any control position of the rotary body 203 via the first inlet E1 (not shown here).

As can be seen the edge 219 of the first opening 217 is still located in line with the transverse axis y and therefore at 0°. In this initial phase none of the openings 217, 218 are in line with any of the outlets A1-A3, and therefore no flow of the coolant is enabled through the control means 200. Merely the leak channel 216 in this first control position R1 is within the borders delimiting the first outlet A1, such that a trickle flow (not shown in greater detail here) is enabled through the leak channel 216 and thus out from the housing 202 via the first outlet A1.

FIGS. 15 to 21 schematically illustrate further phases during the operation of the internal combustion engine in conjunction with further respective control positions R2 to R7 of the control means 200.

Figure 15:
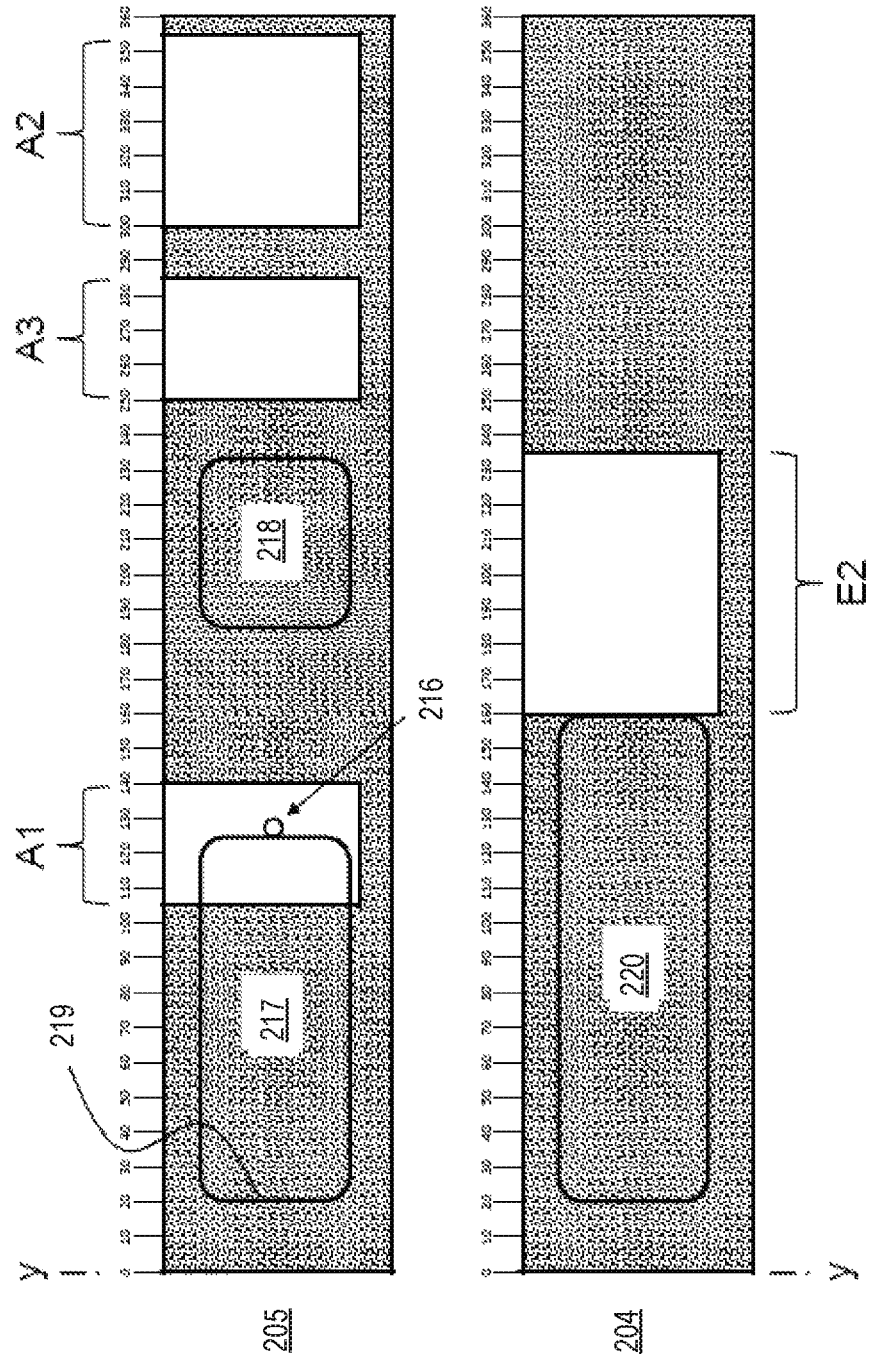
FIG. 15 shows a schematic illustration of a second control position of the control means from FIGS. 12 and 13.

The phase shown in FIG. 15 is characterized by a heating request of the heating arrangement in the warm-up phase of the internal combustion engine. By rotation R of the rotary body 203, a second control position R2 has been occupied. In the present case the performed rotation R is approximately 20°. In the second control position R2 only the first inlet E1 acted on permanently by coolant and the first outlet A1 are fluidically connected to one another. For this purpose the first outlet A1 is at least partially opened. In this way the coolant flow K1 coming from the cylinder head, in particular on the outlet side, can pass through the control means 200 as coolant flow K3 into the secondary circuit. The heat energy already contained in the coolant flow can thus be guided to the heating arrangement. An equally possible arrangement of an AGR system (not shown in greater detail) within the secondary circuit may additionally serve to meet the heating request via the heating arrangement. In the second control position R2 the second inlet E2 connected via the second and third outlet A2, A3 to the primary circuit is closed, such that at least the coolant flow K2 of the coolant jacket of the engine block remains dormant.

Figure 16:
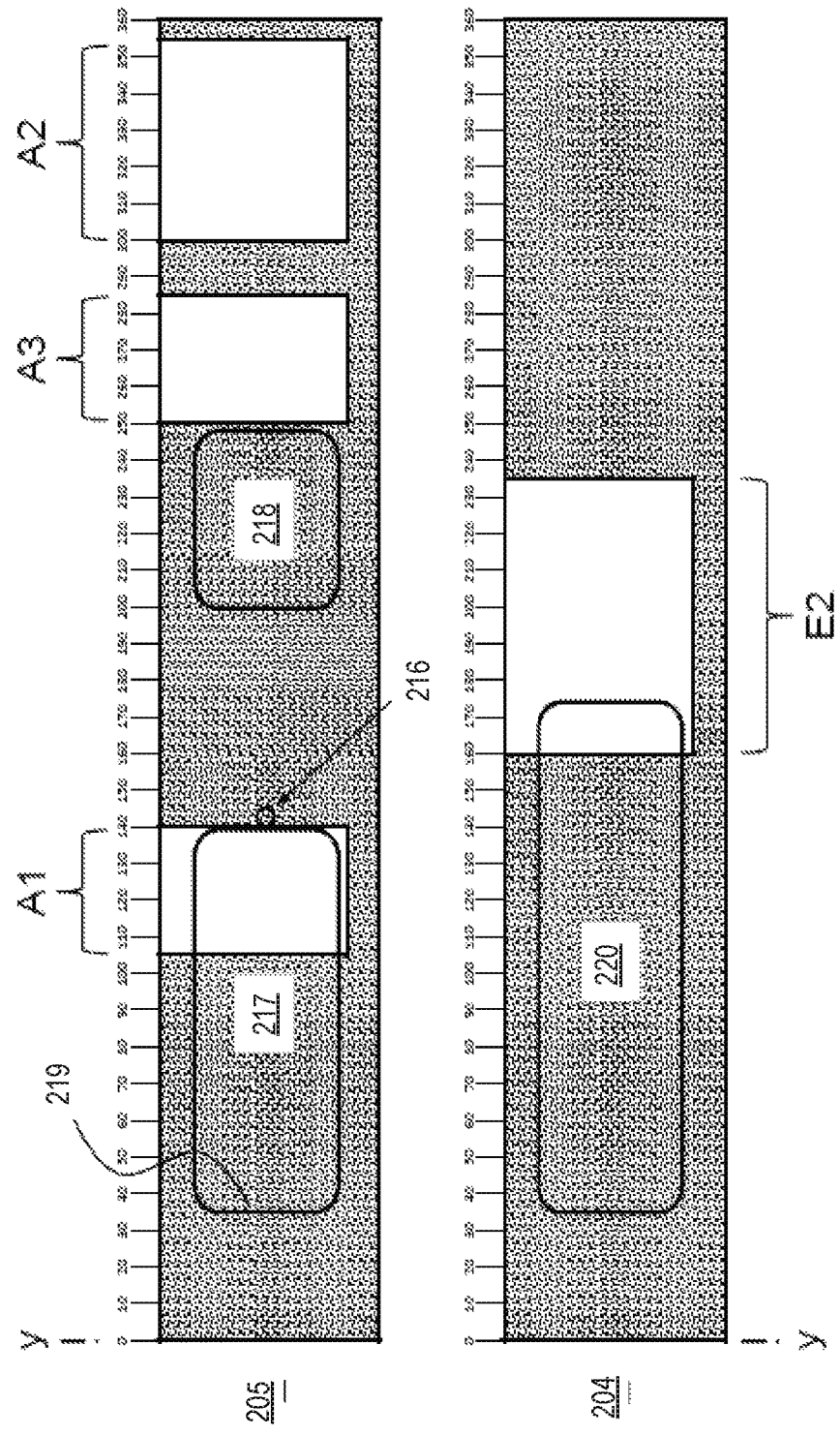
FIG. 16 shows a schematic illustration of a third control position of the control means from FIGS. 12 and 13.

A further phase can be seen in FIG. 16, in which a maximum heating request is present. For this purpose the rotary body 203 has been rotated in the present case via a rotation R through a further 15° to approximately 35° compared to its original position. In this phase the third control position R3 is occupied, in which the second and third outlet A2, A3 are still closed, whereas the first outlet A1 is now completely open. On the inlet side, besides the first inlet E1, the second inlet E2 is now also at least partially open. The coolant flows K1, K2 coming from the internal combustion engine are thus bundled within the control means 200 and the internal connection thereof as it were, in such a way that they are jointly forwarded as coolant flow K3 via the first outlet A1 into the secondary circuit. The total heat energy contained in the coolant can thus be used in order to be delivered at least in part to the heating arrangement.

Figure 17:
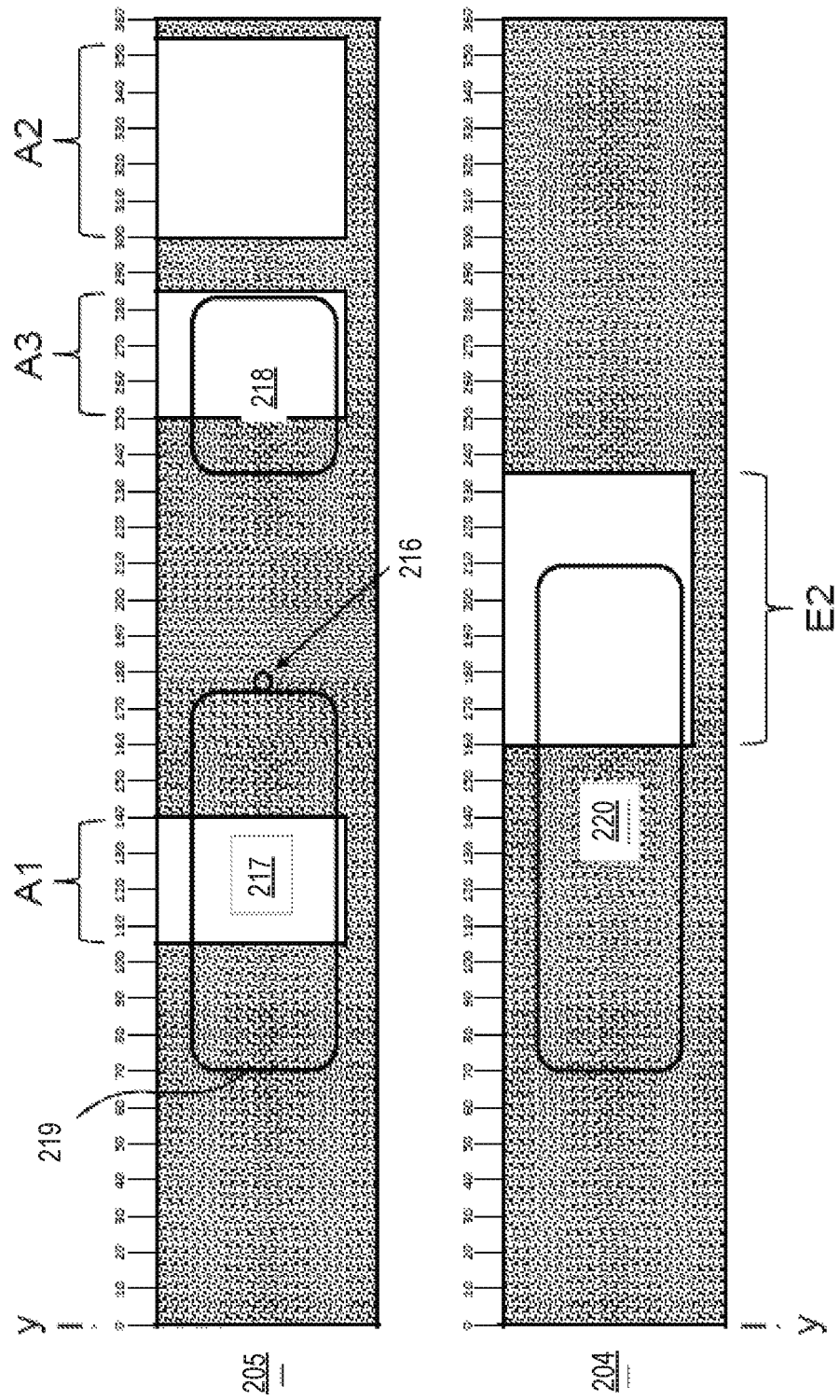
FIG. 17 shows a schematic illustration of a fourth control position of the control means from FIGS. 12 and 13.

With increasing heating of the internal combustion engine, the phase visible in FIG. 17 is reached, in which a fourth control position R4 of the rotary body 203 is occupied. Herein, the third outlet A3 is also opened in addition to the opened first outlet A1, such that the coolant flow K1 coming from the cylinder head can be introduced together with the coolant flow K2 coming from the engine block into the external bypass as coolant flow K4. For this purpose the rotary body 203 is rotated in the present case via a rotation R through approximately 70° compared to its original position. In this way a heating request can be met and a circulation of the coolant in respect of the internal combustion engine can also take place. The phase shown here differs from the previous phase in such a way that a certain heat dissipation can be attained by the circulation of the coolant in the internal combustion engine.

Figure 18:
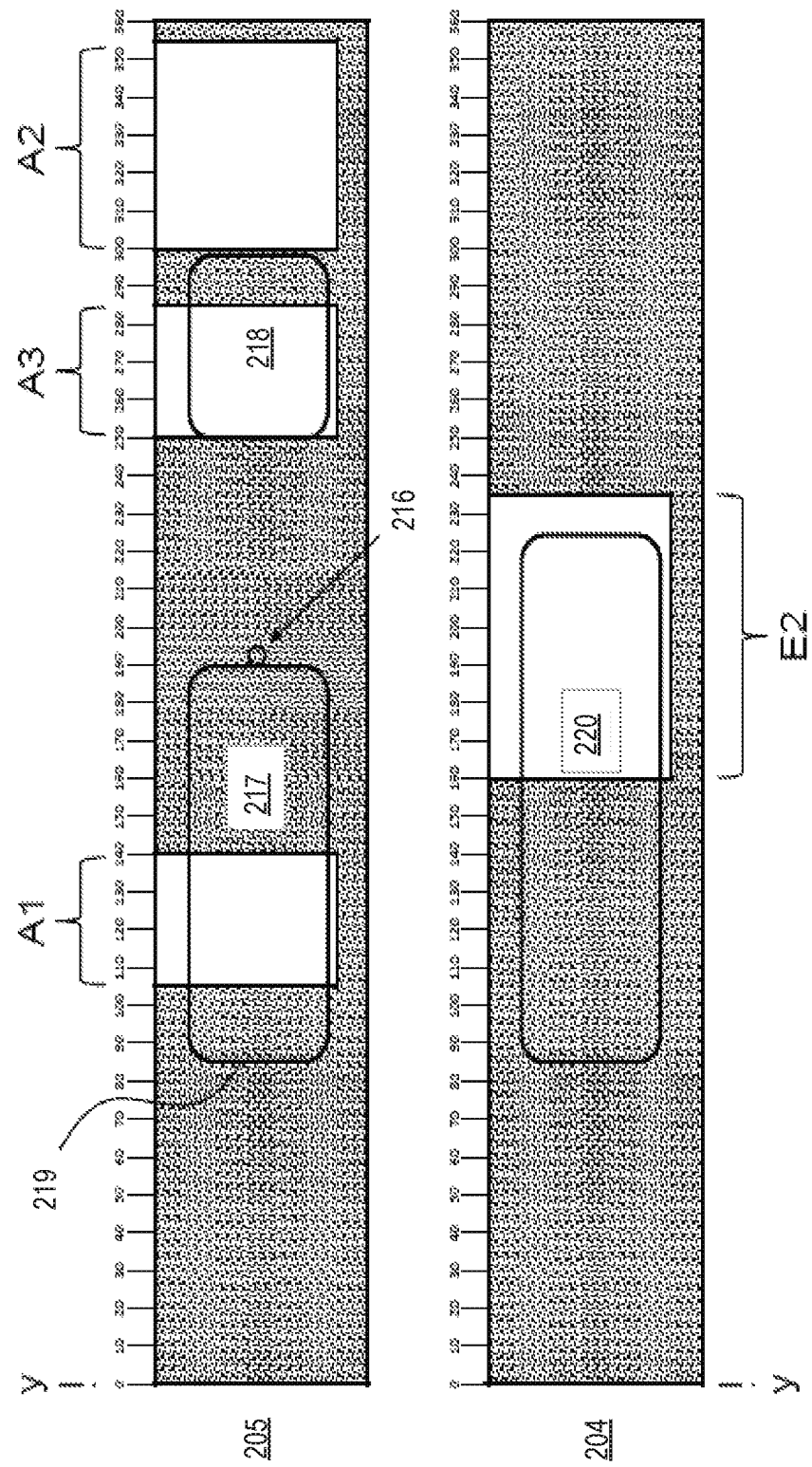
FIG. 18 shows a schematic illustration in the region of the fourth control position of the control means from FIGS. 12 and 13.

FIG. 18 also shows the fourth control position R4, in which the rotary body 203 has been rotated through a further 15° to approximately 85° compared to its starting position. The position of the rotary body 203 shown here differs from the illustration in FIG. 17 in that the second inlet E2 is now practically fully opened. With increasing rotation R of the rotary body 203, the closure of the third outlet A3, which is fluidically connected to the external bypass, is now begun.

Figure 19:
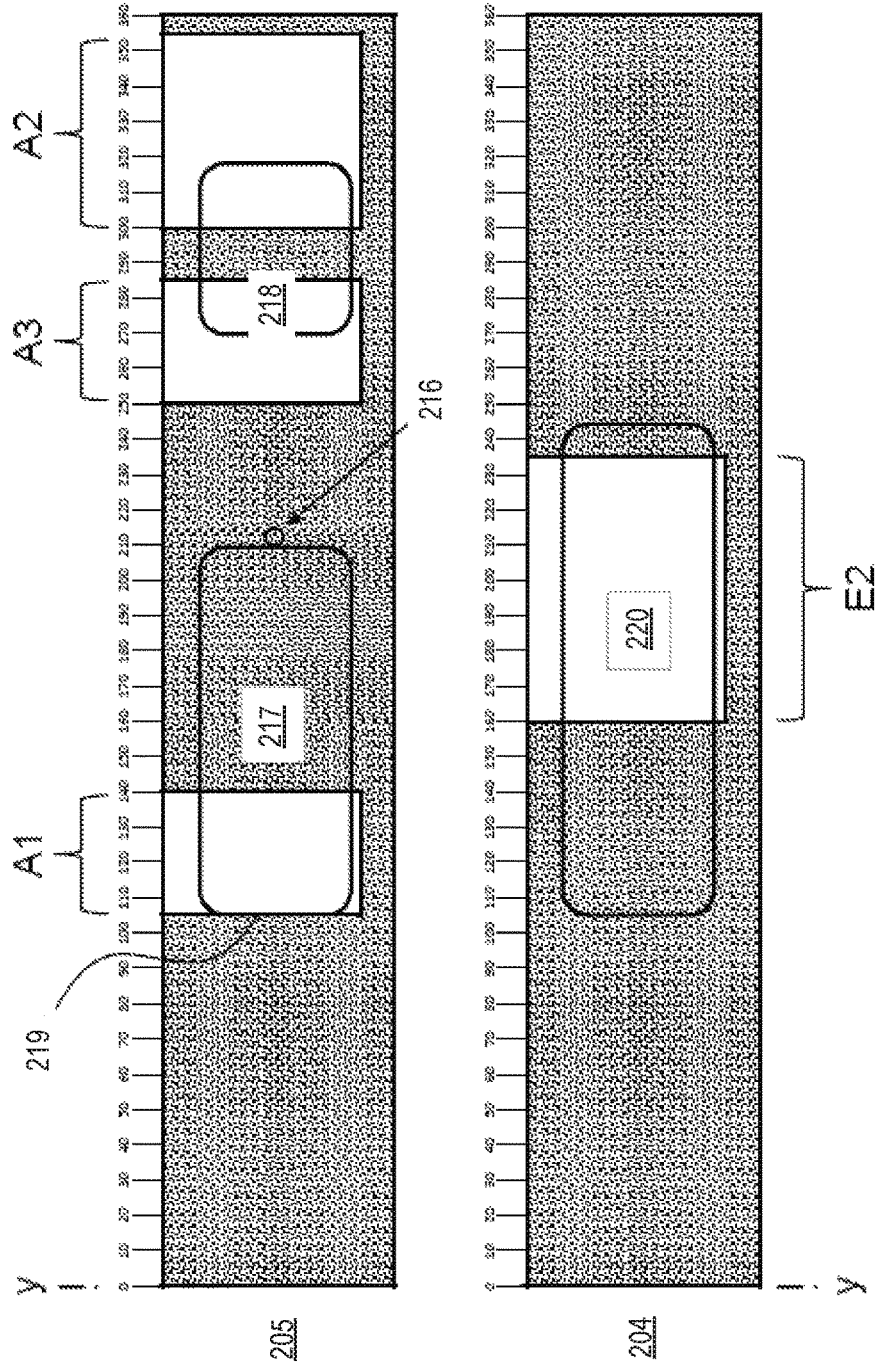
FIG. 19 shows a schematic illustration of a fifth control position of the control means from FIGS. 12 and 13.

The phase visible in FIG. 19 is entered as soon as the operating temperature of the internal combustion engine is reached and external cooling is necessary. Herein, the rotary body 203 is rotated further into a fifth control position R5, this now having been rotated through approximately 105° compared to its starting position. The second outlet A2 is now thus additionally at least partially opened, whereas the third outlet A3 is now partially closed again. In this way the coolant flows K1, K2 coming from the cylinder head and from the engine block can be introduced both as coolant flow K4 into the external bypass (third outlet A3) and into the primary circuit as coolant flow K5. Some of the coolant is thus guided through the cooler arrangement, such that the coolant and therefore the internal combustion engine are cooled.

Figure 20:
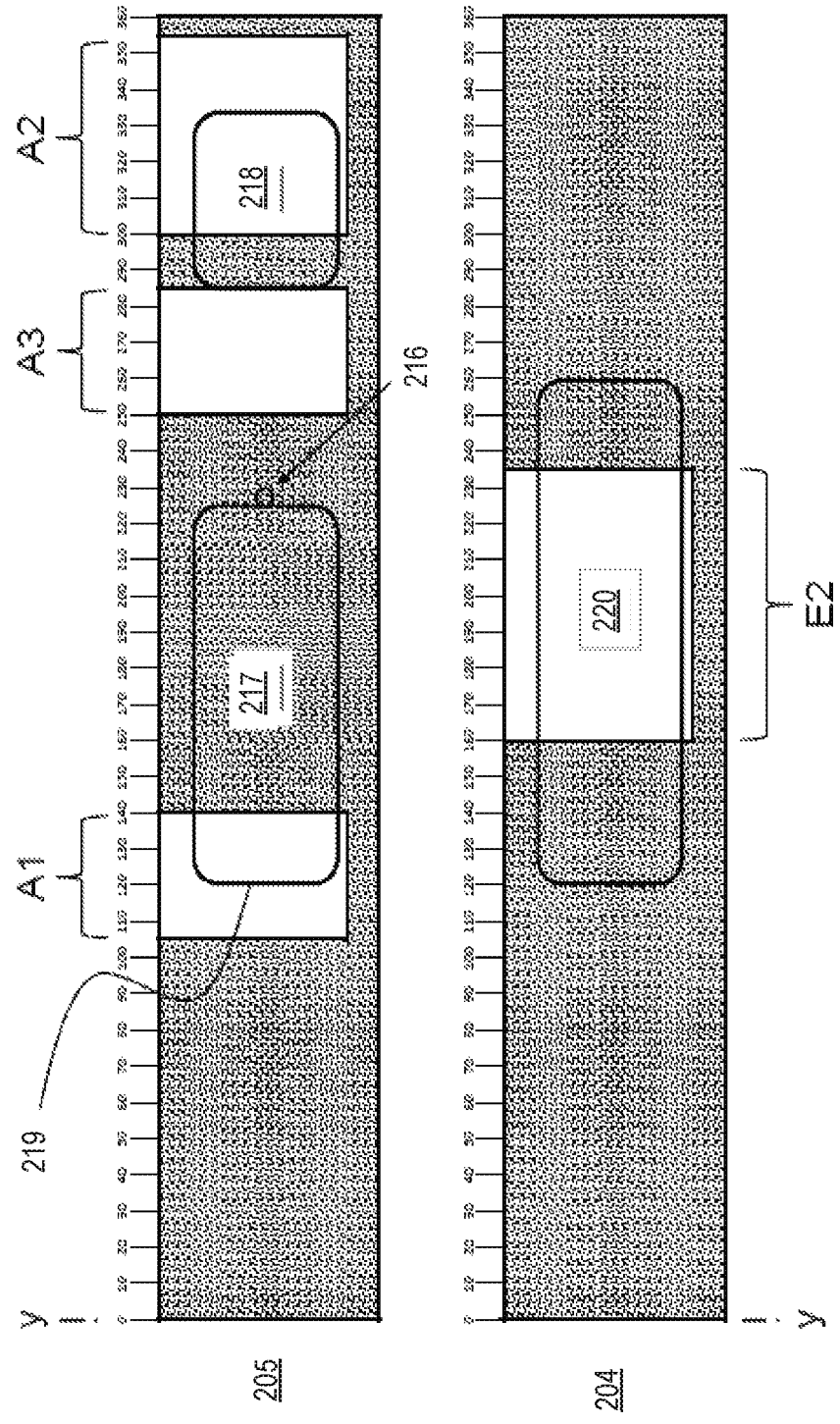
FIG. 20 shows a schematic illustration of a sixth control position of the control means from FIGS. 12 and 13.

FIG. 20 shows a sixth control position R6. For this purpose the rotary body has been rotated through approximately 120° compared to its starting position via a rotation. It can be seen in this phase that the first outlet A1 is still opened at least partially, whereas the third outlet A3 connected to the external bypass is closed. This phase constitutes a preparation for maximum cooling of the internal combustion engine.

Figure 21:
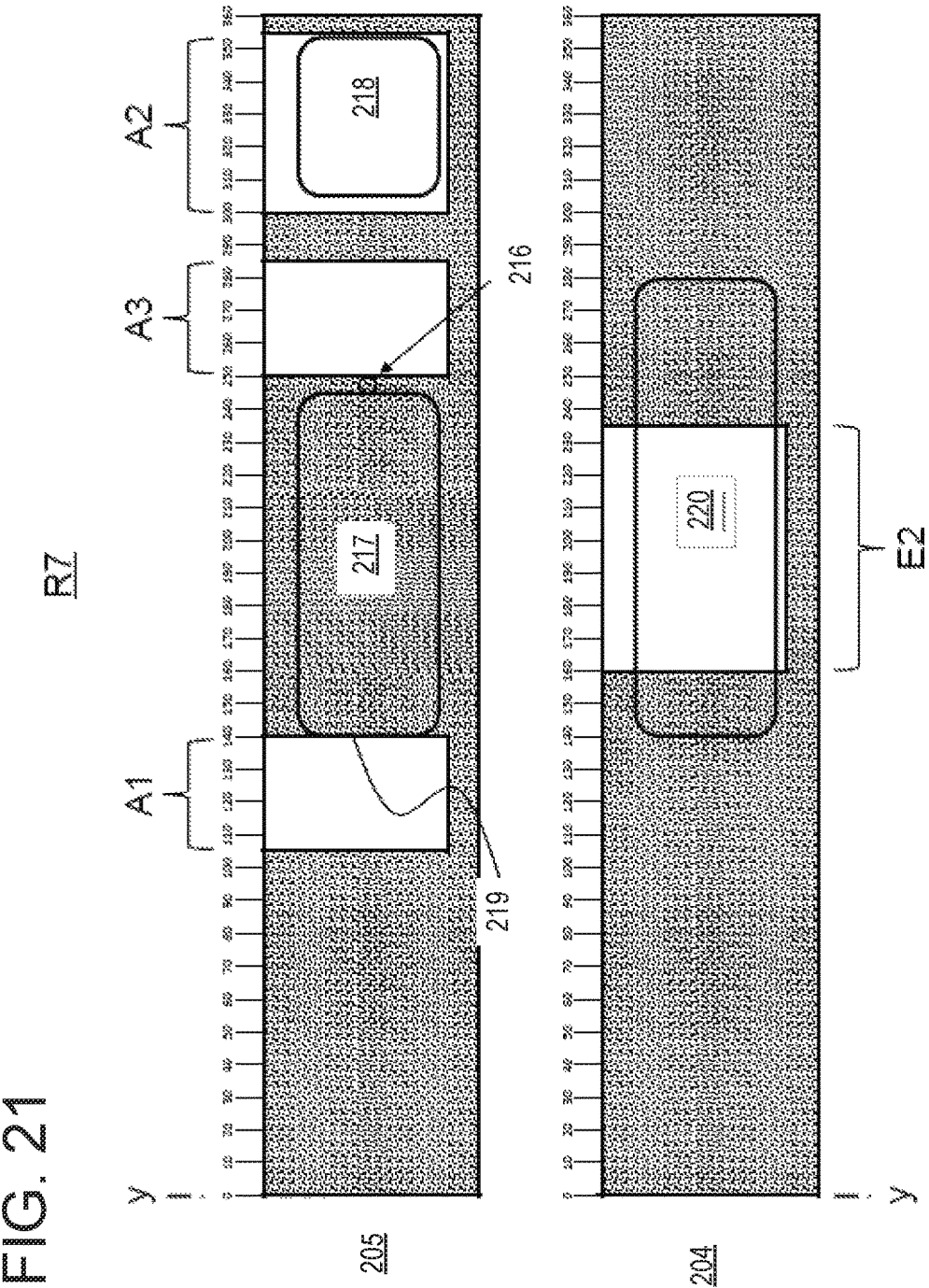
FIG. 21 shows a schematic illustration of a seventh control position of the control means from FIGS. 12 and 13.

The phase deducible from FIG. 21 shows a state that now provides a maximum cooling capability for the internal combustion engine. For this purpose the rotary body 203 in the present case has been rotated via a further rotation R to approximately 140° compared to its original position. In the seventh control position R7 now occupied here, the first and third outlets A1, A3 are completely closed, whereas the second outlet A2 fluidically connected to the primary circuit is completely open. At the same time the first inlet E1 and the second inlet E2 are fluidically connected to one another via the internal connection of the rotary body 203. This is possible by a substantially hollow embodiment of the rotary body 203 in combination with corresponding openings 217, 218, 220 arranged through the wall of said rotary body. In this way the coolant flows K1, K2 coming from the entire coolant jacket of the internal combustion engine are bundled and forwarded as coolant flow K5 only into the primary circuit, where they flow through the cooler arrangement. In other words all the coolant is thus conveyed in the direction of the cooler arrangement, such that maximum cooling can be provided. The leak channel 216 is also closed here.

FIG. 22 shows a method 300 for operating rotating a cylinder (body) of revolution in response to changing engine conditions. Instructions for carrying out method 300 may be executed by a controller based on instructions stored on a memory of the controller and in conjunction with signals received from sensors of the engine system, such as the sensors described above with reference to FIG. 9. The controller may employ actuators adjust a control means operation, according to the methods described below. The method 300 may be described with reference to components described above.

Method 300 begins at 302 to determine, estimate, and/or measure current engine operating parameters. The current engine operating parameters may include one or more of but are not limited to engine load, engine temperature, vehicle speed, ambient temperature, coolant temperature, engine oil temperature, and air/fuel ratio.

At 304, the method 300 includes determining if a vehicle heating request is present. The vehicle heating may be requested by an operator and/or passenger of the vehicle requesting for warm air to be delivered in a cabin of the vehicle. A vehicle heating arrangement is located in a secondary coolant circuit of the engine for providing heated air to the cabin. Thus, vehicle heating may be provided when coolant from a coolant jacket of the engine flows into the secondary circuit and flows through the vehicle heating arrangement. If the driver and/or passengers of the vehicle have not requested cabin heating, then the method 300 proceeds to 306 to determine if the engine is undergoing a cold-start. A cold-start may be determined if an engine temperature is less than a desired temperature range and if the engine was initiated recently. The engine temperature may be determined via one or more of a temperature sensor in the engine and a coolant temperature sensor measuring a coolant temperature downstream of the engine. Either one of the temperature measurements may be used to determine the engine temperature. In some examples, an averages of the temperatures may be used to determine the engine temperature.

If the engine is undergoing a cold-start, then the method 300 proceed to 308 to rotate the cylinder of revolution in the control means to enter the R1 position. Rotating the cylinder of revolution includes adjusting an actuator via a signal from a control to rotate the cylinder of revolution about its longitudinal axis. In some examples, the cylinder of revolution may rotate in only a single direction about the longitudinal axis (clockwise or counterclockwise). In other examples, the cylinder of revolution may rotate in clockwise and counterclockwise directions depending on a direction desired to reach a desired position. For example, rotating from the R1 position to the R3 position may be accomplished by rotating in a clockwise direction more efficiently than rotating in a counterclockwise direction. Alternatively, rotating from the R1 position to the R5 position may be accomplished by rotating in the counterclockwise direction more efficiently than rotating in the clockwise direction.

As described above, the R1 position stagnates coolant flow such that coolant in the coolant jacket adjacent the cylinder head 4 and the crankcase 3 do not flow out of the coolant jacket. In this way, coolant may not be coolant and the engine, and therefore the coolant, may warm-up more rapidly compared to a system flowing coolant. Thus, in the R1 position, coolant does not enter the main circuit, the secondary circuit, or the bypass passage.

At the 310, the method 300 maintains the cylinder of revolution in the R1 position until conditions for the R1 position are no longer met. Parameters for exiting the R1 position may include a vehicle heating request, engine cooling request, engine reaching the desired temperature range, portions of the engine reaching the desired temperature range while remaining portions of the engine are below the temperature range, and a coolant temperature exceeding a threshold coolant temperature. The threshold coolant temperature may be based on a coolant boiling temperature (e.g., 212° F.). The method 300 may continue to monitor engine and/or coolant conditions.

Returning to 306, if the method 300 determines the engine is not undergoing a cold-start, then the method 300 proceeds to 312. At 312, the method 300 determines if an engine temperature is greater than the desired engine operating temperature range (e.g., 185°-205° F.). As described above, the engine temperature may be determined via an engine temperature sensor or the thermostat arrangement in the control means (thermostat arrangement 9 in the embodiment of FIG. 1). If the engine temperature is not greater than the operating temperature range, then the method 300 proceeds to 313 to monitor and/or maintain current engine operating parameters. In some examples, the cylinder of revolution may be in the R5 position where cabin heating is not provided and coolant in the split coolant circuit flows through the main circuit, is cooled by a heat exchanger, and flows back to the engine. In this way, nominal engine operating conditions (engine temperature is in the desired range and no vehicle heating is requested) may be conducted in the R5 position of the cylinder of revolution. In some examples, only coolant from the upper side of the head may flow to the main circuit while coolant from the crankcase flows through the bypass. In this way, the engine may receive a combination of cooled coolant and warmer coolant to maintain the engine temperature within the desired range.

If the engine temperature is greater than the operating temperature range, then the method 300 proceeds to 314 to enter the R5 position by signaling the actuator to rotate the cylinder of revolution. In the R5 position, coolant from the upper side of the engine head and coolant from the crankcase flow into the main circuit where the coolant may be cooled by a heat exchanger. The cooled, combined coolant flow flows back to the engine where a coolant pump (e.g., coolant pump 19 in the embodiment of FIG. 1) splits the coolant flow to the upper side and the crankcase. In this way, the R5 position provides maximal engine cooling in the absence of a vehicle heating request by allowing coolant that was previously in the upper side to flow to the crankcase and vice-versa.

At 316, the method 300 maintains the cylinder of revolution in the R5 position until R5 position conditions are no longer met. The condition for the R5 position may no longer be met if there is a vehicle heating request and/or if the engine temperature falls below the desired temperature range.

Returning to 304, if the method 300 determines a vehicle heating request is present, then the method 300 proceeds to 318 to determine if the engine temperature is less than the desired temperature range. If the engine temperature is not less than the desired temperature range, then the method 300 proceeds to 320 to determine if cooling is desired. Cooling may be desired if the engine temperature is above the desired temperature range and/or if a coolant temperature is above the threshold coolant temperature. If cooling is desired, then the method 300 proceeds to 322 to enter the R4 position rotating the cylinder of revolution via the actuator. The direction of rotation may be based on a previous position of the cylinder of revolution. In the R4 position, openings of the cylinder of revolution guide coolant flow to flow into the main circuit, the secondary circuit, and the bypass. In this way, coolant in the main circuit is cooled, coolant in the secondary circuit passes through a vehicle heating arrangement to heat a cabin, and coolant in the bypass flows uninterruptedly to the coolant pump upstream of the engine. At the coolant pump, the coolant from the three paths combine and are then separated and directed to either the upper side or the crankcase.

At 326, the method 300 maintains the R4 position until R4 conditions are no longer met. The R4 conditions may no longer be met if cooling is no longer desired and/or if a vehicle heating request is absent.

Returning to 320, if the method 300 determines cooling is not desired, then the method 300 proceeds to 328 to enter the R6 position. In the R6 position, coolant from the upper side and the crankcase is directed through the secondary circuit comprising the vehicle heating arrangement. In this way, the R6 position provides a maximum amount of vehicle (cabin) heating in response to the engine and the coolant operating within their respective desired temperature ranges.

At 330, the method 300 includes maintaining the R6 position until R6 position conditions are no longer met. For example, the R6 position conditions may no longer be met if a vehicle heating request is disabled and/or if the engine and/or the coolant desire cooling or heating.

Returning to 318, if the method 300 determines the engine temperature is less than the desired operating temperature range, then the method 300 proceeds to 332 to determine if the engine is undergoing a cold-start, similar to 306 described above. If a cold-start is occurring, then the method 300 proceeds to 334 to enter the R2 position. In the R2 position, coolant from the upper side (outlet side) of the cylinder head flows through the secondary circuit to provide vehicle heating while coolant in the crankcase is stagnated and does not flow out of the crankcase. Coolant in the upper side may warm-up faster than coolant in the crankcase due to its proximity to hot exhaust gas allowing the vehicle heating arrangement to provide vehicle heating independent of ambient temperatures. Furthermore, due to the design of the split cooling system as described above, the cooling system may be fairly compact while providing ample heating and cooling of the engine and vehicle interior.

As coolant returns to the engine when the cylinder of revolution is in the R2 position, the coolant pump may direct all the coolant back to the upper side. In this way, coolant does not enter and/or leave the crankcase.

At 336, the method 300 maintains the R2 position until R2 position condition are no longer met. R2 position conditions may no longer bet met if a vehicle heating request is absent or if an engine temperature is within the desired engine operating temperature range.

Returning to 332, if the method 300 determines a cold-start is not occurring, then the method 300 proceeds to 338 to enter the R3 position, where coolant from the upper side is directed to the secondary circuit and coolant from the crankcase is directed to the bypass. In the R3 position, vehicle heating is provided and engine heating becomes increasingly uniform due to the mixing of coolant from different area of the engine (e.g., the upper side and the crankcase). By mixing coolant from different areas of the engine, hot spots and/or cold spots of the engine may be prevented and/or removed due to a uniform coolant temperature flowing to the upper side and the crankcase.

At 340, the method 300 maintains the R3 position until R3 conditions are no longer met. R3 conditions may no longer be met if a vehicle heating request is absent or if an engine temperature is greater than or equal to the desired engine operating temperature.

In this way, a split cooling system may provide increased engine cooling and/or increased vehicle heating by mixing coolants from fluidly separated portions of an engine. The coolants may mix in either an upper through bore or a lower through bore before flowing to a secondary circuit or a main circuit, respectively. The technical effect of mixing the coolants in the control means is to provide increase vehicle heating or increased engine cooling without additional valves and/or other components to maintain a compact size of the split cooling system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
rotating a rotating body of a control valve of a split cooling system to a position based on conditions to selectively direct coolant flow from an upper side of a cylinder head and from a crankcase to each of a main coolant circuit, a secondary coolant circuit, and an external bypass, and where coolant from the upper side of the cylinder head mixes with coolant from the crankcase and flows to a cooler arrangement without flowing to a heating arrangement for heating a vehicle interior in response to an engine temperature being greater than or equal to a desired engine operating temperature in one of a plurality of control positions.

2. The method of claim 1, wherein the position is selected from the plurality of control positions that comprises:
a first control position where coolant from the upper side of the cylinder head and from the crankcase is stagnated;
a second control position including coolant from the upper side of the cylinder head flowing through an upper passageway fluidly coupling the upper side of the cylinder head to an upper through bore of the rotating body to the secondary coolant circuit comprising the heating arrangement, and wherein coolant from the crankcase is stagnated;
a third control position including flowing coolant from the upper side of the cylinder head into the secondary coolant circuit and flowing coolant from the crankcase and a lower side of the cylinder head to the external bypass via a central through bore of the rotating body;
a fourth control position including flowing coolant from the upper side of the cylinder head into the secondary coolant circuit and flowing coolant from the crankcase and the lower side of the cylinder head into the external bypass and the main coolant circuit via the central through bore and a lower through bore, respectively, of the rotating body, wherein the main coolant circuit comprises the cooler arrangement;
a fifth control position including mixing coolant from the upper side of the cylinder head with coolant from the lower side of the cylinder head and the crankcase in the control valve via a first internal bypass of the control valve and flowing all of the mixture to the main coolant circuit via the lower through bore of the rotating body; and
a sixth control position including mixing coolant from the upper side of the cylinder head with coolant from the lower side of the cylinder head and the crankcase in the control valve via a second internal bypass of the control valve and flowing all of the mixture to the secondary coolant circuit via the upper through bore of the rotating body.

3. The method of claim 2, wherein flowing coolant through the main coolant circuit decreases an engine temperature, flowing coolant through the secondary coolant circuit increases a cabin temperature, and flowing coolant through the external bypass maintains the engine and cabin temperatures.

4. The method of claim 2, wherein mixing coolant provides an increased engine cooling or an increased cabin heating.

5. The method of claim 2, wherein the split cooling system further comprises two inlets and three outlets, wherein a first outlet is arranged at a first angle relative to a transverse axis, wherein a second outlet is arranged at a second angle greater than the first angle relative to the transverse axis, and wherein a third outlet is arranged at a third angle greater than the second angle relative to the transverse axis.

6. The method of claim 5, wherein the first control position includes where none of the inlets are aligned with any of the outlets.

7. The method of claim 5, wherein the first control position comprises rotating a first inlet and a second inlet 0 degrees relative to the transverse axis.

8. The method of claim 7, wherein the second control position is rotated 20 degrees relative to the first control position, wherein the first inlet is at least partially aligned and fluidly coupled to the first outlet, and wherein coolant does not flow through the second inlet, the second outlet, and the third outlet.

9. The method of claim 7, wherein the third control position is rotated 35 degrees relative to the first control position in response to a maximum heat request, wherein the first inlet is fully open and the second inlet is at least partially open, each of the first and second inlets being fluidly coupled to the first outlet, and wherein coolant does not flow through the second and third outlets.

10. The method of claim 7, wherein the fourth control position is rotated 70 degrees relative to the first control position, wherein the first inlet and the second inlet are fluidly coupled to the first outlet and the third outlet respectively, and wherein coolant does not flow through the second outlet.

11. The method of claim 10, wherein the fourth control position is further rotated 15 degrees, wherein the first inlet and the second inlet are fluidly coupled to the first outlet and the second outlet, respectively, and wherein the third outlet is at least partially closed.

12. The method of claim 7, wherein the fifth control position is rotated 105 degrees relative to the first control position, and wherein the first inlet is fluidly coupled to the first outlet and the second inlet is fluidly coupled to each of the second and third outlets.

13. The method of claim 7, wherein the sixth control position is rotated 120 degrees relative to the first control position in response to a desire for maximum cooling of an engine, wherein the first inlet is partially fluidly coupled to the first outlet and the second inlet is fully fluidly coupled to the second outlet, and wherein coolant does not flow through the third outlet.

14. The method of claim 13, wherein the sixth control position is further rotated 20 degrees to a seventh control position, and wherein the seventh control position comprises flowing coolant from each of the first and second inlets to only the second outlet.

15. The method of claim 14, wherein a leak channel is closed.

16. The method of claim 7, wherein the rotating body of the control valve of the split cooling system is hollow, and wherein the rotating body of the control valve of the split cooling system is shaped to fluidly couple the first and second inlets during some control positions.

17. The method of claim 1, wherein the upper side of the cylinder head is an outlet-side.

18. The method of claim 1, wherein outlets of the split cooling system are arranged in a star-shape along a common plane.

19. The method of claim 1, wherein the split cooling system is at least partly spherical.

20. The method of claim 1, wherein the split cooling system comprises a front chamber and a rear chamber, and wherein the front chamber corresponds to an inlet-side of the split cooling system and the rear chamber corresponds to an outlet-side of the split cooling system.

* * * * *